(12) United States Patent
Kalantar

(10) Patent No.: US 11,834,813 B2
(45) Date of Patent: Dec. 5, 2023

(54) IMU BASED SYSTEM FOR VERTICAL AXIS JOINT ANGLE ESTIMATION FOR SWING BOOM EXCAVATORS

(71) Applicant: Topcon Positioning Systems, Inc., Livermore, CA (US)

(72) Inventor: Shahab Kalantar, Brisbane (AU)

(73) Assignee: Topcon Positioning Systems, Inc., Livermore, CA (US)

( * ) Notice: Subject to any disclaimer, the term of this patent is extended or adjusted under 35 U.S.C. 154(b) by 151 days.

(21) Appl. No.: 17/305,596

(22) Filed: Jul. 9, 2021

(65) Prior Publication Data

US 2023/0018606 A1    Jan. 19, 2023

(51) Int. Cl.
| | |
|---|---|
| *E02F 9/26* | (2006.01) |
| *G01B 21/22* | (2006.01) |
| *G01P 15/08* | (2006.01) |
| *G01P 15/18* | (2013.01) |

(52) U.S. Cl.
CPC .............. *E02F 9/265* (2013.01); *E02F 9/264* (2013.01); *G01B 21/22* (2013.01); *G01P 15/08* (2013.01); *G01P 15/18* (2013.01)

(58) Field of Classification Search
CPC .......... E02F 9/265; E02F 9/264; G01B 21/22; G01P 15/18; G01P 15/08
See application file for complete search history.

(56) References Cited

U.S. PATENT DOCUMENTS

| | | | |
|---|---|---|---|
| 2004/0010359 A1* | 1/2004 | Koch ................ | E02F 9/265 701/50 |
| 2010/0138180 A1* | 6/2010 | Sugihara ........... | B25J 9/163 702/145 |
| 2012/0203487 A1 | 8/2012 | Johnson et al. | |
| 2013/0079949 A1* | 3/2013 | Friend .............. | B60W 40/076 701/1 |
| 2016/0237655 A1* | 8/2016 | Baba ................. | E02F 9/264 |
| 2016/0251836 A1* | 9/2016 | Baba ................. | E02F 9/265 701/50 |

(Continued)

FOREIGN PATENT DOCUMENTS

EP    1041474 A2    10/2000

OTHER PUBLICATIONS

International Search Report and Written Opinion dated Nov. 8, 2022, in connection with International Patent Application No. PCT/US2022/073442, 10 pgs.

(Continued)

*Primary Examiner* — Dale W Hilgendorf
(74) *Attorney, Agent, or Firm* — CHIESA SHAHINIAN & GIANTOMASI PC

(57) ABSTRACT

Systems and methods for determining a swing angle of a swing boom of a vehicle are provided. Sensor data is received from sensors disposed on a swing boom and a body of a vehicle. It is determined whether the swing boom is static or moving relative to the body based on the sensor data. In response to determining that the swing boom is static, the received sensor data is corrected based on an observed swing angle and an estimated swing angle is calculated based on the corrected sensor data. In response to determining that the swing boom is moving, the estimated swing angle is calculated based on the received sensor data. The estimated swing angle is output.

18 Claims, 20 Drawing Sheets

(56) References Cited

U.S. PATENT DOCUMENTS

| | | | |
|---|---|---|---|
| 2018/0110190 A1 | 4/2018 | Mahrenholz et al. | |
| 2018/0372498 A1* | 12/2018 | Nackers | G01C 21/165 |
| 2019/0360174 A1* | 11/2019 | Kawamoto | G01S 5/163 |
| 2020/0200537 A1* | 6/2020 | Ceisel | E02F 9/264 |
| 2021/0215483 A1* | 7/2021 | Krone | G01C 21/165 |
| 2021/0293972 A1* | 9/2021 | Tamazato | G01C 15/00 |
| 2022/0195693 A1* | 6/2022 | Kalantar | E02F 3/847 |
| 2022/0298757 A1* | 9/2022 | Moriya | E02F 9/264 |

OTHER PUBLICATIONS

Euston et al., "A complementary filter for attitude estimation of a fixed-wing UAV," 2008 IEEE/RSJ International Conference on Intelligent Robots and Systems, 2008, pp. 340-345.

Stančin et al., "Angle Estimation of Simultaneous Orthogonal Rotations from 3D Gyroscope Measurements," 2011, Sensors, vol. 11, No. 9, pp. 8536-8549.

Tomažič et al., "Simultaneous Orthogonal Rotations Angle," 2011, Elektrotehniški Vestnik, 78(1-2), pp. 7-11.

Bennett et al., "Motion Based Acceleration Correction for Improved Sensor Orientation Estimates," 2014 11th International Conference on Wearable and Implantable Body Sensor Networks, 2014, pp. 109-114.

Bevly et al., "GNSS for Vehicle Control," 2010, Artech House, 285 pgs.

Zhou et al., "Oscillation Detection Algorithm Development Summary Report and Test Plan," 2009, Pacific Northwest National Lab, PNNL-18945.

Skog et al., "Zero-Velocity Detection—An Algorithm Evaluation," 2010, IEEE Transactions on Biomedical Engineering, vol. 57, Issue: 11, pp. 2657-2666.

Ma et al., "A zero velocity intervals detection algorithm based on sensor fusion for indoor navigation systems," 2016, Advances in Engineering Research (AER), vol. 117, 2nd Annual International Conference on Electronics, Electrical Engineering and Information Science (EEEIS), pp. 780-786.

Yu, "An algorithm to detect zero-velocity in automobiles using accelerometer signals," 2008, Master of Science Thesis, Tampre University of Technology, 57 pgs.

Afzal et al., "Use of Earth's Magnetic Field for Mitigating Gyroscope Errors Regardless of Magnetic Perturbation," 2011, Sensors, 11(12), pp. 11390-11414.

Sakhnov et al., "Approach for Energy-Based Voice Detector with Adaptive Scaling Factor," 2009, IAENG International Journal of Computer Science, vol. 36 Issue 4, pp. 394-399.

Strömbäck et al., "Foot-Mounted Inertial Navigation and Cooperative Sensor Fusion for Indoor Positioning," 2010, Proceedings of the 2010 International Technical Meeting of The Institute of Navigation, pp. 89-98.

Magnis et al. "Estimation of Attitude from a Single-Direction Sensor," 2017, CRC Press, Taylor & Francis Group. pp. 261-275.

Yang et al., "Measurement of Ground Slope and Aspect Using Two Inclinometers and GPS," 1997, Transactions of the ASAE, vol. 40(6), pp. 1769-1776.

Barbosa et al., "Slope Gradient and Vehicle Attitude Definition Based on Pitch and Roll Angle Measurements: A Simplified Approach," 2012, The Open Agriculture Journal, vol. 6, pp. 36-40.

Gilfillan et al., "Attitude of a tractor on sloping land," 1967, Journal of Agricultural Engineering Research, vol. 12, Issue 4, pp. 293-296.

Noor et al., "Development of a Voice Activity Controlled Noise Canceller," 2012, Sensors, 12(5), pp. 6727-6745.

Zheng et al., "Angle estimation of a single-axis rotation: a practical inertial-measurement-unit-based method," 2017, IET Science, Measurement & Technology, vol. 11 Issue 7, pp. 892-899.

Sohn et al., "A statistical model-based voice activity detection," 1999, IEEE Signal Processing Letters, vol. 6, Issue: 1, pp. 1-3.

Becedas et al., "Estimation of Mass-Spring-Damper Systems," 2009, Advances in Computational Algorithms and Data Analysis, pp. 411-422.

"How to find the best parameters to fit damped oscillations curves," MATLAB Answers, 2020, retrieved online on May 8, 2021 from: https://au.mathworks.com/matlabcentral/answers/501462-how-to-find-the-best-parameters-to-fit-damped-oscillations-curves, 5 pgs.

Degani, "Taming HAL: Designing Interfaces Beyond 2001," 2004, Palgrave Macmillan, 321 pgs.

Aggarwal, "Outlier Analysis," 2013, Springer, 455 pgs.

Rowe et al., "An instrumented tractor for use in motion behaviour studies on sloping ground," 1976, Journal of Agricultural Engineering Research vol. 21, Issue 4, pp. 355-360.

Fourati et al., "Multisensor Attitude Estimation," 2017, CRC Press, Taylor & Francis Group, pp. 261-275.

Makni et al., "Adaptive Kalman filter for MEMS-IMU based attitude estimation under external acceleration and parsimonious use of gyroscopes," 2014 European Control Conference (ECC), 2014, pp. 1379-1384.

Mitrev et al., "Numerical study of the hydraulic excavator overturning stability during performing lifting operations," 2019, Advances in Mechanical Engineering, vol. 11(5), pp. 1-14.

Yang, "Spacecraft Modeling, Attitude Determination, and Control Quaternion-based Approach," 2019, CRC Press, 340 pgs.

Suh et al., "Attitude Estimation Adaptively Compensating External Acceleration," 2006, JSME International Journal Series C Mechanical Systems, Machine Elements and Manufacturing, vol. 49, No. 1, pp. 172-179.

Ting et al., "A Kalman filter for robust outlier detection," 2007, Proceedings of the 2007 IEEE/RSJ International Conference on Intelligent Robots and Systems, pp. 1514-1519.

Cipra et al., "Kalman filter with outliers and missing observations," 1997, Test, vol. 6, No. 2, pp. 379-395.

Widodo et al., "Attitude Estimation Using Kalman Filtering: External Acceleration Compensation Considerations," 2016, Journal of Sensors, vol. 2016, Article ID 6943040, 24 pages.

* cited by examiner

IMU BASED SYSTEM FOR VERTICAL AXIS JOINT ANGLE ESTIMATION FOR SWING BOOM EXCAVATORS

TECHNICAL FIELD

The present invention relates generally to vertical axis joint angle estimation for swing boom excavators, and in particular to an IMU (inertial measurement unit) based system for vertical axis joint angle estimation for swing boom excavators.

BACKGROUND

Guidance and automatic positioning control systems have become increasingly popular in construction, mining, and agricultural machines. For example, in swing boom excavators, guidance systems may increase operator awareness while automatic positioning control systems may ease some complexity in navigating the excavator and positioning the swing boom. To implement such guidance and automatic positioning control systems, it is important to accurately estimate joint angles between each joint of the swing boom.

In one conventional approach, gyroscopes are used to measure motion and determine angles between joints of the boom. However, such conventional gyroscopes suffer from drift due to gyroscope bias. Accelerometers may be used to correct for such drift. However, accelerometers are unable to sufficiently correct gyroscope bias for joints that are vertical or nearly vertical. This is because, unlike axes whose projection on the horizontal axis is large enough, the force output by the accelerometer remains the same even as the joint angle changes.

BRIEF SUMMARY OF THE INVENTION

In accordance with one or more embodiments, systems and methods for determining a swing angle of a swing boom of a vehicle are provided. Sensor data is received from sensors disposed on a swing boom and a body of a vehicle. It is determined whether the swing boom is static or moving relative to the body based on the sensor data. In response to determining that the swing boom is static, the received sensor data is corrected based on an observed swing angle and an estimated swing angle is calculated based on the corrected sensor data. In response to determining that the swing boom is moving, the estimated swing angle is calculated based on the received sensor data. The estimated swing angle is output.

In one embodiment, it is determined whether the swing boom is static or moving relative to the body by calculating an energy of a signal received from the sensors, comparing the calculated energy to one or more thresholds, and determining whether the swing boom is static or moving based on the comparing.

In one embodiment, correcting the received sensor data comprises comparing the observed swing angle with a last estimated swing angle and removing bias from the sensor data based on the comparing.

In one embodiment, it is determined that the estimated swing angle exceeds a swing limit of the vehicle and a Kalman filter used for calculating the estimated swing angle is reset.

In one embodiment, the observed swing angle is calculated by determining rotation axes of the sensors and calculating the observed swing angle based on the determined rotation axes. In another embodiment, the observed swing angle is calculated by determining a swing angle error by transfer alignment and calculating the observed swing angle based on the swing angle error. In another embodiment, the observed swing angle is calculated by calculating the observed swing angle based on a roll and pitch of the vehicle in response to determining that the vehicle is situated on a slope satisfying a slope threshold.

In one embodiment, the sensors are IMUs (inertial measurement units). In one embodiment, the vehicle is an excavator.

These and other advantages of the invention will be apparent to those of ordinary skill in the art by reference to the following detailed description and the accompanying drawings.

DETAILED DESCRIPTION

Embodiments described herein provide for an IMU (inertial measurement unit) based swing angle estimation system. Using only sensor data from IMUs disposed on a vehicle, a data-fusion swing angle system is provided that combines a plurality of algorithms to estimate the swing angle of the swing boom of a vehicle with respect to a body of the vehicle. Specifically, the algorithms include kinematic angle estimation (where hypothesis testing is used to determine static-dynamic epochs), rotation axis computation, transfer alignment (that uses residual oscillations of the machine), and finally, one that takes advantage of the slope if it is not zero. Also disclosed is an embodiment where an existing sensor disposed on the boom is used, eliminating the need for an additional IMU on the swing link. The estimated swing angle can be used in a guidance and/or automatic control system for an excavator. Knowing this angle is important if the operator is allowed to change the angle, which he should, to take full advantage of excavators equipped with this extra feature. The vehicle may be, for example, a construction machine, a mining machine, an agricultural machine, etc. In one example, the vehicle is an excavator, as shown in FIG. 1.

Figure 1:
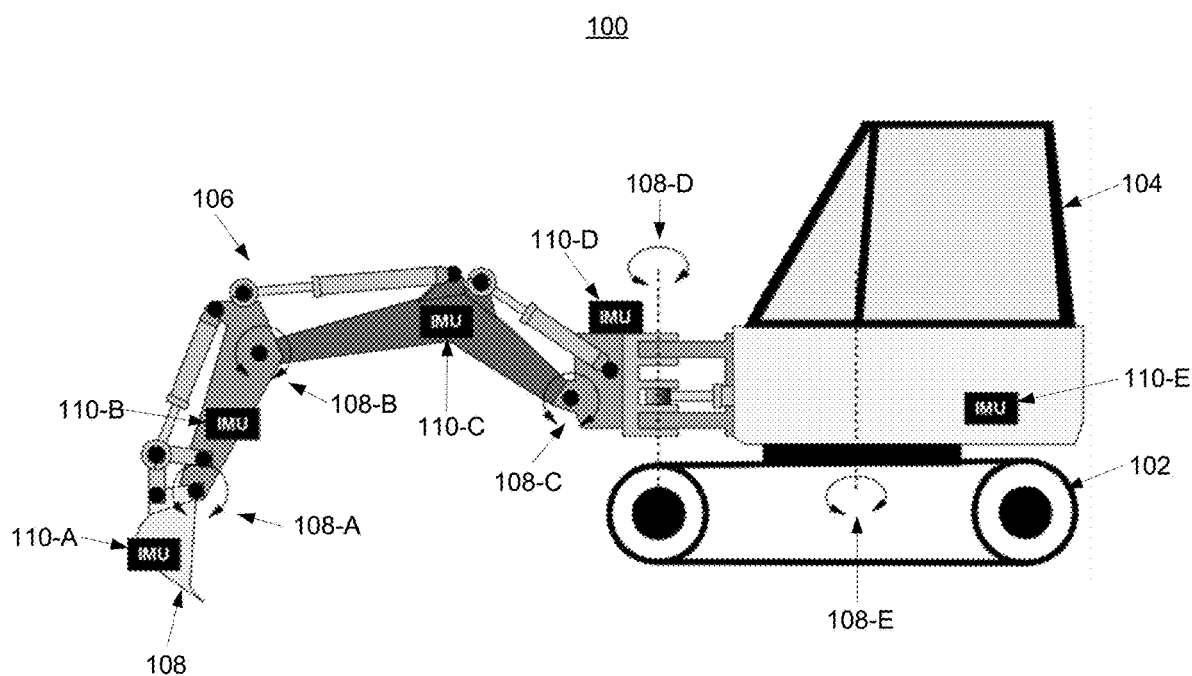
FIG. 1 shows an exemplary excavator on which one or more embodiments described herein may be implemented.

FIG. 1 shows an exemplary excavator 100 on which one or more embodiments described herein may be implemented. Excavator 100 is shown in FIG. 1 as a compact or mini-excavator, but may be implemented in any suitable form. Excavator 100 comprises body (or house) 104 for housing an operator and other components, undercarriage 102 comprising tracks for navigating excavator 100 and supporting body 104, and boom swing 106 coupled to bucket 108 for manipulating soil or other material. Excavator 100 may additionally or alternatively comprise other elements, such as, e.g., a blade for performing dozing operations. In operation, excavator 100 rotates at one or more joints 108-A, 108-B, 108-C, 108-D, and 108-E (collectively referred to as joints 108) to perform various tasks, such as, e.g., digging, dumping, manipulating soil, etc.

As shown in FIG. 1, the plurality of IMUs comprises IMU 110-A disposed on bucket 108, IMUs 110-B, 110-C, and 110-D disposed on boom swing 106, and IMU 110-E disposed on body 104 (collectively referred to as IMUs 110). In one embodiment, each IMU 110 comprises a three-axis gyroscope and a three-axis accelerometer. However, each IMU 110 may be any suitable sensor or sensors for measuring angular velocity and acceleration. For example, IMUs 110 may instead be implemented as discrete gyroscopes and discrete accelerometers.

In accordance with embodiments described herein, the swing angle at joint 108-D of excavator 100 is determined solely from information from IMUs 110-D and IMU 110-E. The swing angle is the angle formed by swing boom 106 with respect to some reference plane when excavator 100 is viewed from the top down, and is shown in FIG. 1 as the angle of joint 108-D. The swing angle is further illustrated in FIG. 2, described in more detail below. The angle of other joints (such as, e.g., joint 108-E) may also be determined in accordance with embodiments described herein. The angles of joints 110 may be used for, e.g., providing guidance to operator of excavator 100 and/or automatically controlling excavator 100.

It should be understood that the number and placement of IMUs 110 on excavator 100 shown in FIG. 1 is exemplary and that the number and placement of IMUs 110 on excavator 100 may vary based on the application. For example, in one application, embodiments described herein may be implemented in a standalone dual-IMU swing angle guidance system using IMU 110-E disposed on body 104 and IMUs 110-D disposed on boom swing 106 for determining the swing angle at joint 108-D, as described above. In another exemplary application, embodiments described herein may be integrated into an already existing guidance and/or control system functioning as a virtual sensor. In another exemplary application, embodiments described herein may utilized existing IMUs on boom swing 106 to reduce costs. In another exemplary application, embodiments describe herein may receive the slew rotation angle of body 104 (which may be derived using a GPS-based attitude estimation sub-system) as input when excavator 100 operates on a slope for improved performance.

A common operational scenario of excavator 100 is as follows: 1) align boom swing 106 with a first heading; 2) operate boom swing 106 (e.g., for digging); 3) align boom swing 106 to a second heading; 4) operate boom swing 106 (e.g., for dumping); and 5) return to step 1 and repeat this cycle. This operational scenario may be achieved by: 1) swinging boom swing 106 to a particular arm angle and slewing between the first heading and the second heading while keeping the swing constant, 2) slewing to a particular house angle and singing boom swing 106 between the first heading and the second heading while keeping the slew constant, or 3) a combination of 1 and 2. With a dual-IMU system, the goal is to estimate the swing angle at joint 108-D using solely the information (i.e., the rate of turn around their 3 axes and the specific force along those axes) from IMUs 110-D and 110-E.

Figure 2:
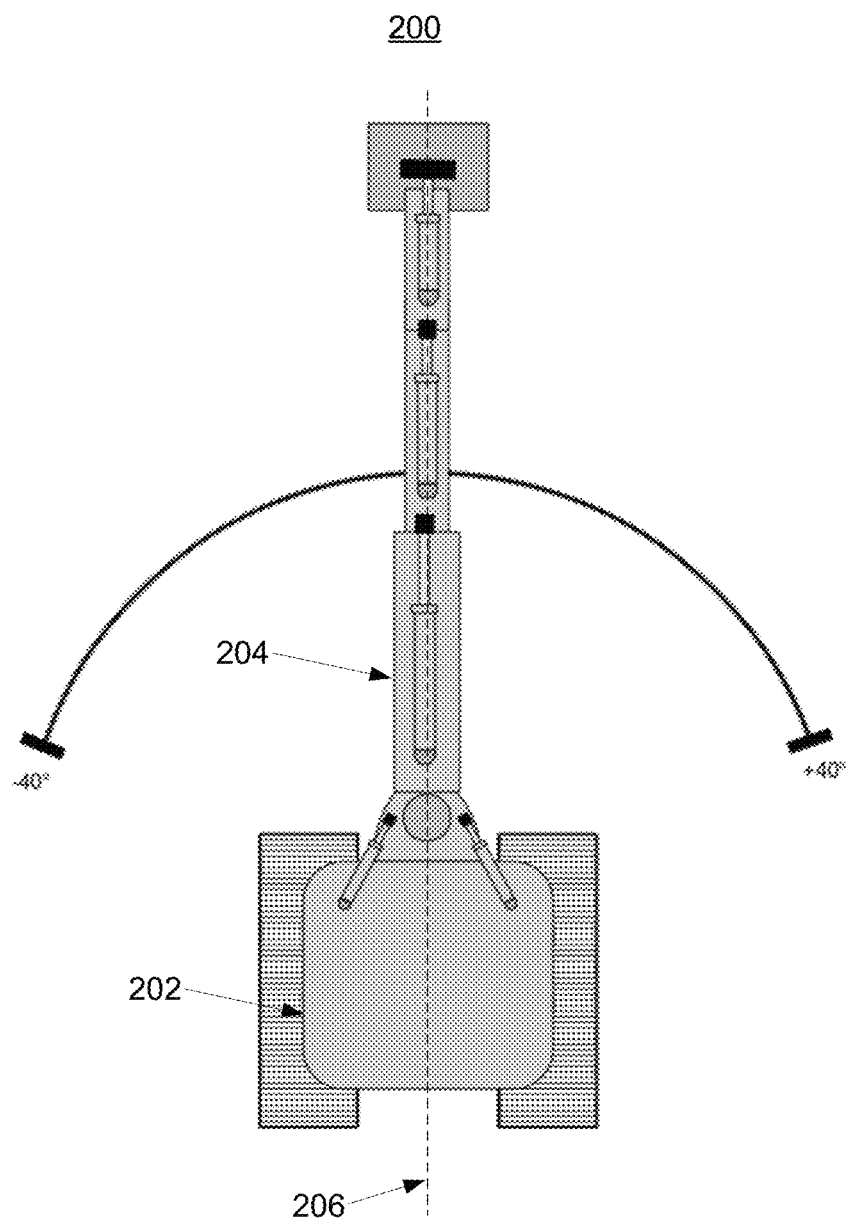
FIG. 2 shows a top down view an excavator, in accordance with one or more embodiments.

FIG. 2 illustratively shows a top down view an excavator 200, in accordance with one or more embodiments. In one example, excavator 200 is excavator 100 of FIG. 1. Excavator 200 comprises body 202 and swing boom 204. The swing angle of excavator 200 is the angle formed by swing boom 204 with respect to reference plane 206 when excavator 200 is viewed from top down. Reference plane 206 is shown in FIG. 2 as the median plane of excavator 200, however it may be any other suitable reference plane. Excavator 200 is shown in FIG. 2 in a reset or zero pose where swing boom 204 is aligned with the front of body 202 (i.e., with reference plane 206) and therefore the swing angle is zero degrees. Swing boom 204 may rotate clockwise and counterclockwise between swing limits of, e.g., −40° and +40° with respect to reference plane 206. The swing limits may be any suitable angle and may be enforce through mechanical stops.

Figure 3:
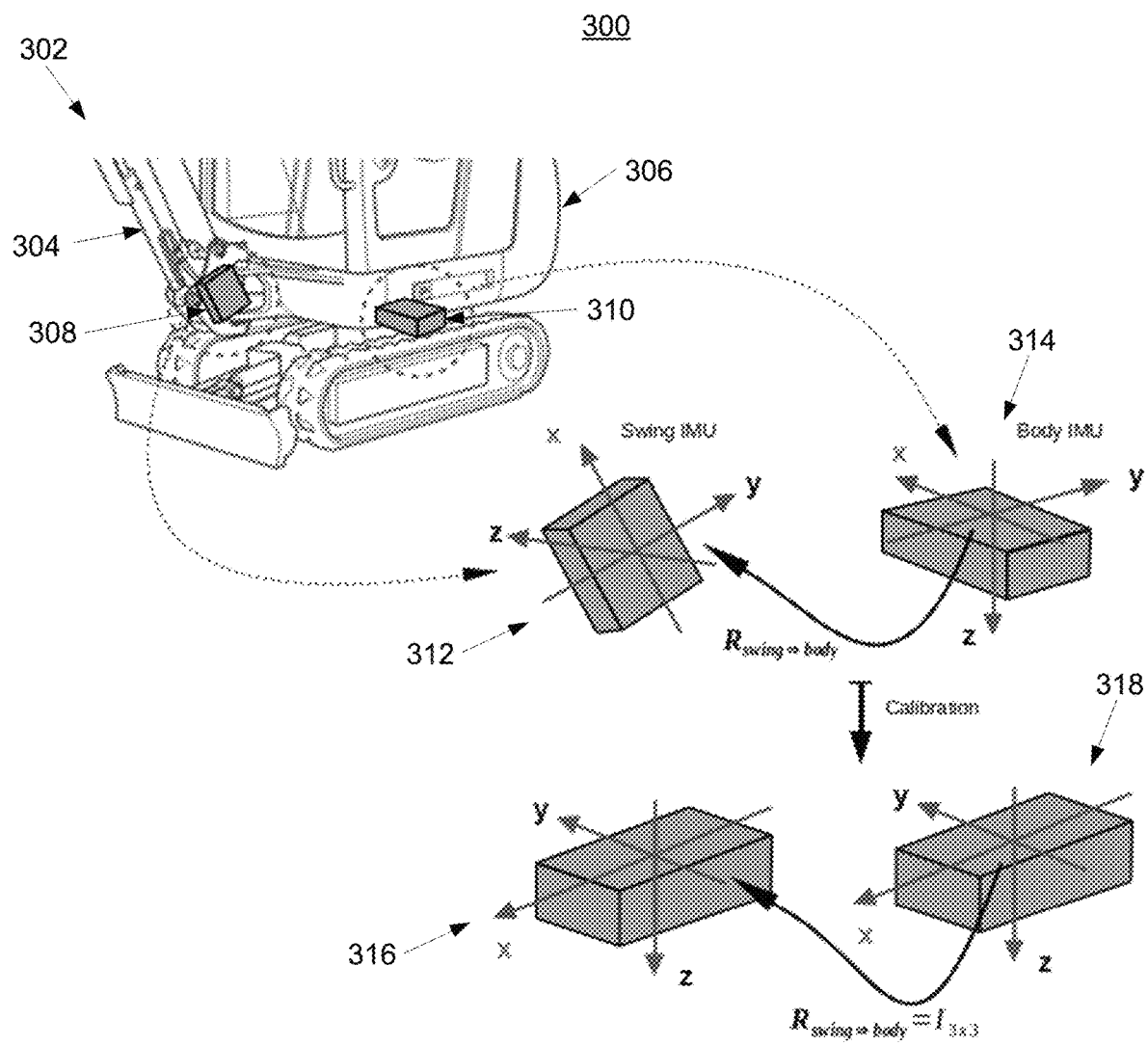
FIG. 3 shows a workflow for calibrating IMUs disposed on an excavator, in accordance with one or more embodiments.

FIG. 3 shows a workflow 300 for calibrating IMUs 308 and 310 disposed on excavator 302, in accordance with one or more embodiments. In one example, excavator 302 may be excavator 100 of FIG. 1. As shown in FIG. 3, swing IMU 308 is disposed on boom swing 304 of excavator 302 and body IMU 310 is disposed on body 306 of excavator 302. IMUs 308 and 310 are calibrated to compensate for nonlinearities, scale factors, gyroscope biases, axis misalignments, and temperature variations. Additionally, IMUs 308 and 310 are calibrated for geometry calibration such that the geometry of excavator 302 and the placement of IMUs 308 and 310 are accurately measured.

The following measurements are of importance: 1) measurements of the positioning of swing boom 304 to align with the front of body 306 (i.e., reset or zero pose), 2) measurements of left and right swing limits of swing boom 304 (e.g., enforced via mechanical stops), and 3) alignment transformation between IMU 308 and IMU 310. Measurement 1 is a prerequisite for measurement 3. Once swing boom 304 is positioned in the reset pose, the rotation matrix aligning IMU 308 with IMU 310 can be estimated accurately.

As shown in workflow 300, initial axes 312 of IMU 308 are calibrated to calibrated axes 316 and initial axes 314 of IMU 310 are calibrated to calibrated axes 318 so that the X axis of IMUs 308 and 310 aligns with the longitudinal (i.e., front/back) axis of excavator 302, the Y axis of IMUs 308 and 310 aligns with the lateral (i.e., left/right) axis of excavator 302, and the Z axis of IMUs 308 and 310 aligns with the vertical (i.e., up/down) axis of excavator 302. Regardless of the alignment of the initial axes 312 and 314, after calibration, the alignment of axes 312 and 314 are the same. It is assumed that the swing motion of swing boom 304 rotates swing IMU 308 around the Z axis, which corresponds to the axis of the single degree of freedom of the joint that connect swing boom 304 and body 306. Formally, a vector $\vec{v}_{swing}$ expressed in the coordinate frame $F_{swing}$ of swing IMU 308 can be expressed in the coordinate frame $F_{body}$ of body IMU 310 according to the following expression:

$$\vec{v}_{body} = R_{swing}^{body} \vec{v}_{swing},$$

where $R_{swing}^{body}$ is equal to $$R_z(\vartheta) = \begin{pmatrix} \cos(\vartheta) & -\sin(\vartheta) & 0 \\ \sin(\vartheta) & \cos(\vartheta) & 0 \\ 0 & 0 & 1 \end{pmatrix}$$

where $\vartheta$ is the swing angle. In some embodiments, the rotation matrix $R_{swing}^{body}$ may account for mechanical tolerances by an error rotation as follows:

$$R_{swing}^{body} = R_z(\vartheta) \cdot \Delta R_{zyx}(\Delta\vartheta, \Delta\varphi, \Delta\psi).$$

The angles making up the error matrix are small and thus, invoking the property of infinitesimal rotations, it can be treated as additive noise:

$$R_{swing}^{body} = R_z(\vartheta) + \Delta R_{zyx}(\Delta\vartheta, \Delta\varphi, \Delta\psi).$$

Figure 4:
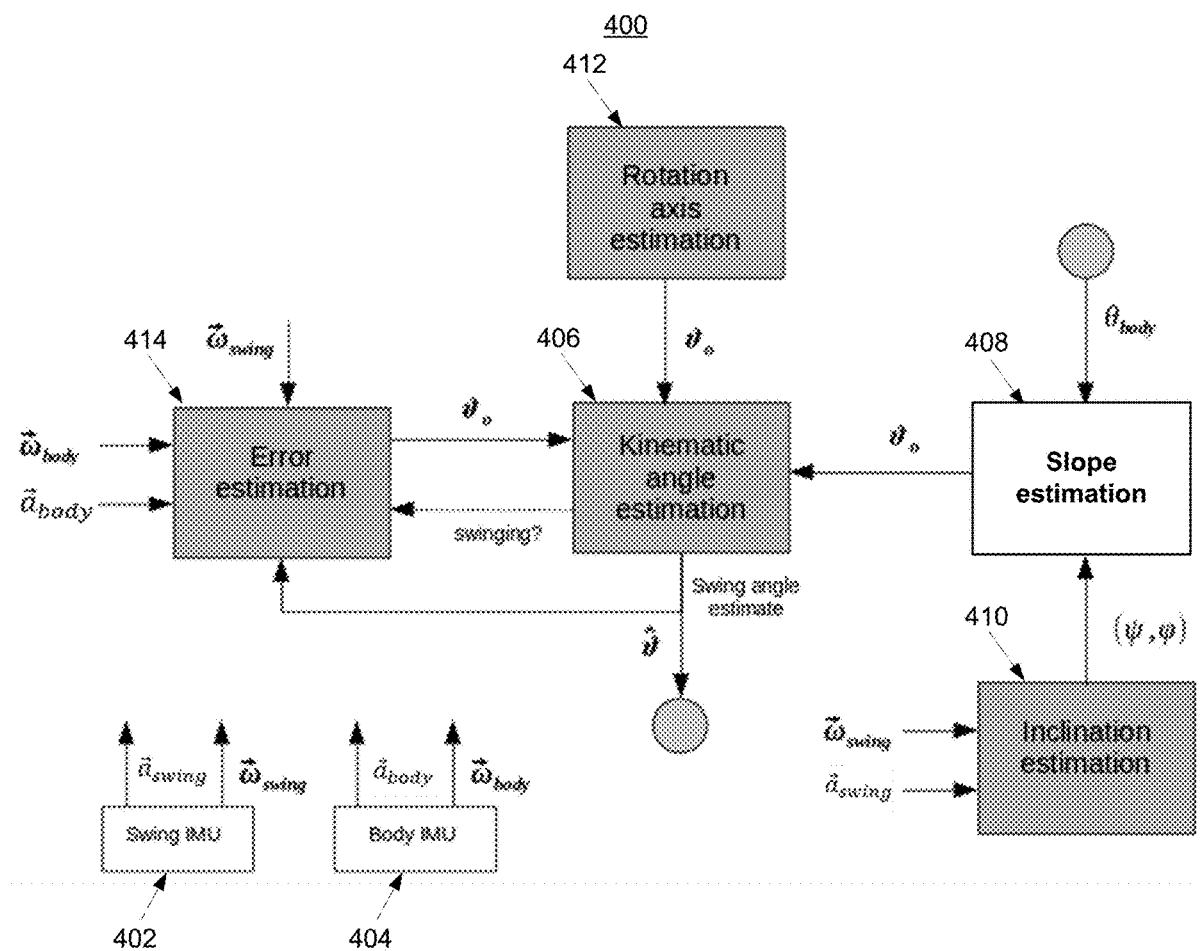
FIG. 4 shows a schematic diagram of a swing angle estimation system for estimating a swing angle of an excavator, in accordance with one or more embodiments.

FIG. 4 shows a schematic diagram of a swing angle estimation system 400 for estimating a swing angle of an excavator, in accordance with one or more embodiments. Swing angle estimation system 400 will be described with continued reference to excavator 100 of FIG. 1. In one example, swing angle estimation system 400 is implemented on excavator 100 shown in FIG. 1 to estimate the swing angle of swing boom 106. However, swing angle estimation system 400 may be implemented in any other suitable vehicle, such as, e.g., a construction machine, a mining machine, an agricultural machine, etc. Swing angle estimation system 400 may be implemented by one or more controllers or any other suitable computing device or devices, such as, e.g., computer 2002 of FIG. 20.

Swing angle estimation system 400 predicts a swing angle estimate $\vartheta$ solely based on angular velocity $\vec{\omega}_{body}$ and acceleration $\vec{\alpha}_{body}$ of the body of the excavator measured by body IMU 404 (e.g., IMU 110-E of FIG. 1) disposed on the body of the excavator and angular velocity $\vec{\omega}_{swing}$ and acceleration $\vec{\alpha}_{swing}$ of the swing boom of the excavator measured by swing IMU 402 (e.g., IMU 110-D of FIG. 1) disposed on the swing boom of the excavator. The core of swing angle estimation system 400 is kinematic angle estimation module 406, which corrects sensor data received from swing IMU 402 and body IMU 404 based on swing angle observations $\vartheta_o$. Swing angle observations $\vartheta_o$ may be computed by slope estimation module 408, rotation axis estimation module 412, and/or error estimation module 414. Error estimation module 414 implements a transfer alignment for estimating swing angle observations $\vartheta_o$ based on angular velocities $\vec{\omega}_{swing}$ and $\vec{\omega}_{body}$ acceleration $\vec{\alpha}_{body}$, and the swing angle estimate $\vartheta$. Rotation axis estimation module 412 determines a rotation axis and calculates swing angle observations $\vartheta_o$ based on the rotation axis under suitable conditions (e.g., large oscillations and low noise). Slope estimation module 408 calculates swing angle observations $\vartheta_o$ when the excavator is situated on a surface with a large enough slope and stays immobile during a long enough period of time based on angular velocity $\vec{\omega}_{swing}$ and acceleration $\vec{\alpha}_{swing}$ using inclination estimation module 410. The modules of swing angle estimation system 400 will be described in further detail below.

Kinematic Angle Estimation

Figure 5:
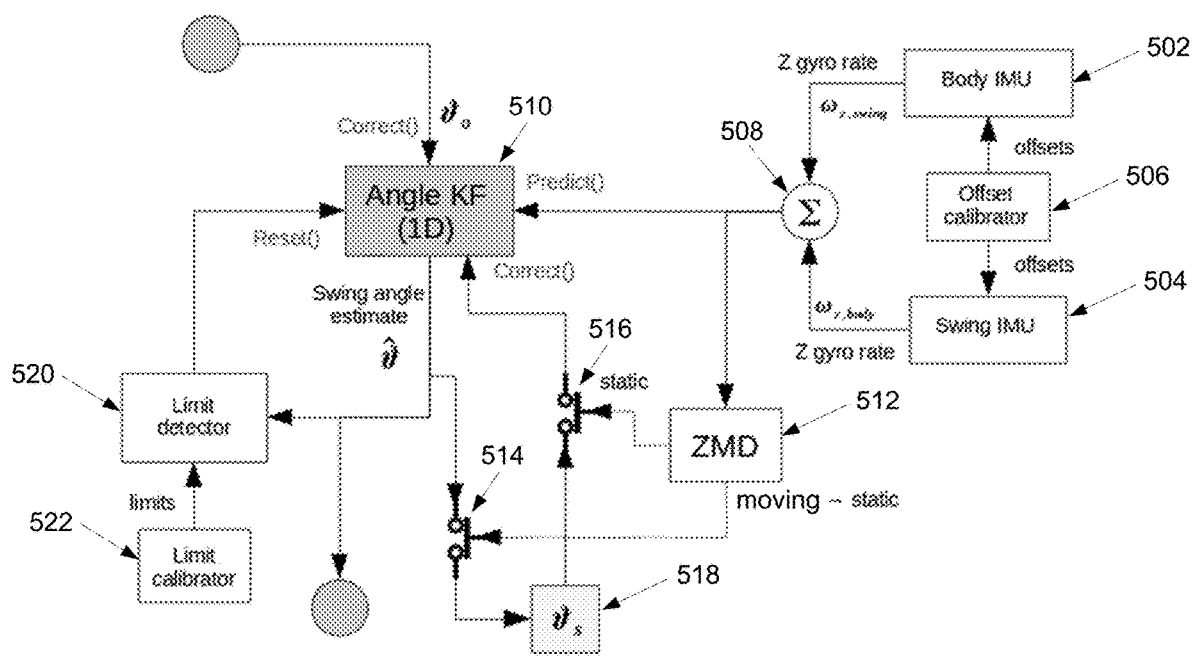
FIG. 5 shows a schematic diagram of a kinematic angle estimation module, in accordance with one or more embodiments.
Figure 6:
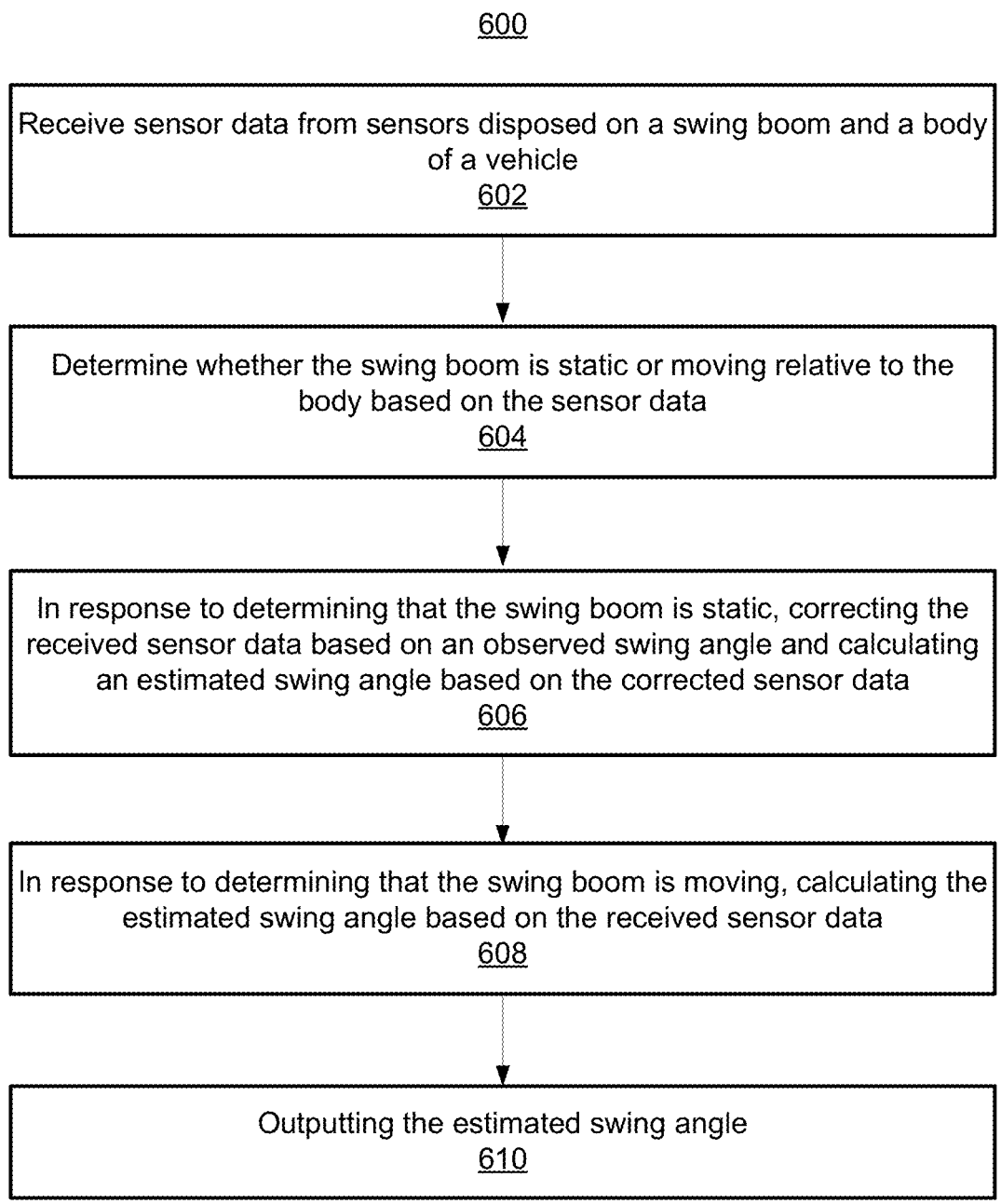
FIG. 6 shows a method for estimating a swing angle of an excavator, in accordance with one or more embodiments.

FIG. 5 shows a schematic diagram of a kinematic angle estimation module 500, in accordance with one or more embodiments. FIG. 6 shows a method 600 for estimating a swing angle of an excavator, in accordance with one or more embodiments. FIGS. 5 and 6 will be described together. In one example, kinematic angle estimation module 500 is kinematic angle estimation module 406 in FIG. 4 and the steps of method 600 are performed by kinematic angle estimation module 406 in FIG. 4.

At step 602 of FIG. 6, sensor data is received from sensors disposed on a swing boom and a body of a vehicle. The vehicle may be, e.g., a construction machine, a mining machine, an agricultural machine, or any other suitable vehicle comprising a swing boom and a body. In one embodiment, the vehicle is excavator 100 of FIG. 1. The sensor data may comprise angular velocity $\vec{\omega}_{body}$ and linear acceleration $\vec{\alpha}_{body}$ of the body measured by one or more of the sensors disposed on the body of the vehicle and angular velocity $\vec{\omega}_{swing}$ and linear acceleration $\vec{\alpha}_{swing}$ of the swing boom measured by one or more of the sensors disposed on the swing boom of the vehicle. The sensor data is expressed in the local coordinate frames of the sensor from which it was measured.

The sensors may comprise any suitable sensors for measuring angular velocity and linear acceleration. In one embodiment, the sensors are IMUs each comprising a gyroscope and an accelerometer. In another embodiment, the sensors comprise discrete gyroscopes and accelerometers. In one example, as shown in FIG. 5, the sensors may be body IMU 502 disposed on a body of the vehicle and swing IMU 504 disposed on a swing boom of the vehicle. Body IMU 502 and swing IMU 504 may be calibrated with offsets determined by offset calibrator 506, e.g., according to workflow 300 of FIG. 3.

At step 604 of FIG. 6, it is determined whether the swing boom is static or moving relative to the body based on the sensor data. For example, as shown in FIG. 5, ZMD (zero movement detection) module 512 determines whether the swing boom is moving or static based on the output of summer 508. The swing boom is moving relative to the body when the swing boom is rotating around the swing joint coupled to the body such that the swing angle is changing.

The determination of whether the swing boom is static or moving may be cast as a hypothesis testing problem, where one of the following two hypotheses must be chosen:
(1) Null hypothesis $H_0$: the swing boom is moving,
(2) Alternate hypothesis $H_1$: the swing boom is static.

The Neyman-Pearson theorem can be applied to provide the threshold for the likelihood ratio test (LRT). The likelihood ratio is an indicator of the likelihood of $H_0$ versus $H_1$. For a series of observations z, the likelihood ratio is defined as:

$$L(z) = \frac{p(z \mid H_1)}{p(z \mid H_0)}$$

where $p(z|H_i)$ is the probability density function for the corresponding hypothesis. Accordingly to the Neyman-Pearson theorem, to maximize the probability of detection $Pr\{H_1|H_1\}$ given the probability of false alarm $Pr\{H_1|H_0\}$ being equal to $\alpha$, $H_1$ must be chosen if $L(z) > \gamma$. $\gamma$ is a threshold determined from $Pr\{H_1|H_0\} = \alpha$ since $$Pr\{H_1|H_0\} = \int_{\{z:L(z)>\gamma\}} p(z|H_0)$$

Stasis of the swing boom is not inclusive of all movements. For example, in this application, only the rate of rotation to $\omega_{z,swing}$ of the boom swing around the Z axis and the linear acceleration $\vec{\omega}_{swing} \times \vec{r}$ projected on the plane whose normal is the Z axis are of interest, where $\vec{r}$ is the vector from the center of the swing joint to sensor on the swing boom. Moreover, gyroscope signals are normally orders of magnitude better than accelerometer signals in terms of quality and noise characteristics. Accordingly, only velocity data (from gyroscope sensors) will be used to detect movement. Therefore, $H_1$ will be chosen where:

$$\frac{1}{N} \sum_{k=1,\ldots,N} \left( \frac{1}{\sigma_\omega} \|\hat{\omega}_{z,swing,k}\|^2 \right) \leftarrow \frac{2}{N} \ln(\gamma)$$

where N is the number of samples. The noise variance $\sigma_\omega$, of the gyroscope is only a scale factor in this special case and can be ignored. In short, the gyroscope signal energy is computed and it is determined whether the swing joint is moving or static if the computed gyroscope signal energy is below some threshold. If $\sigma_\omega$, is ignored in the formula, the left hand side of the inequality is the discrete-time energy of the gyroscope signal (in this case $\omega_{z,swing}$)

Known methods for learning the energy of a signal may be used to determine the value of the threshold. In accordance with such methods, the current (static) energy $\gamma_{now}$ of a gyroscope signal is calculated using a batch of size N. The threshold $\gamma_{new}$ may then be updated iteratively through:

$$\gamma_{new} = (1-p)\gamma_{old} + p \cdot \gamma_{now}$$

where $0 < p < 1$ is the parameter of the first-order filter. To determine p, the last M batches are retained in history. The new batch is then added to the M batches, while the first batch is forgotten to form the new history. The variances of the old ($\sigma_{old}$) and new ($\sigma_{new}$) histories are then compared. In its most general form, a monotonic mapping $f: \sigma_{new}/\sigma_{old} \rightarrow p$ can be applied.

Figure 7:
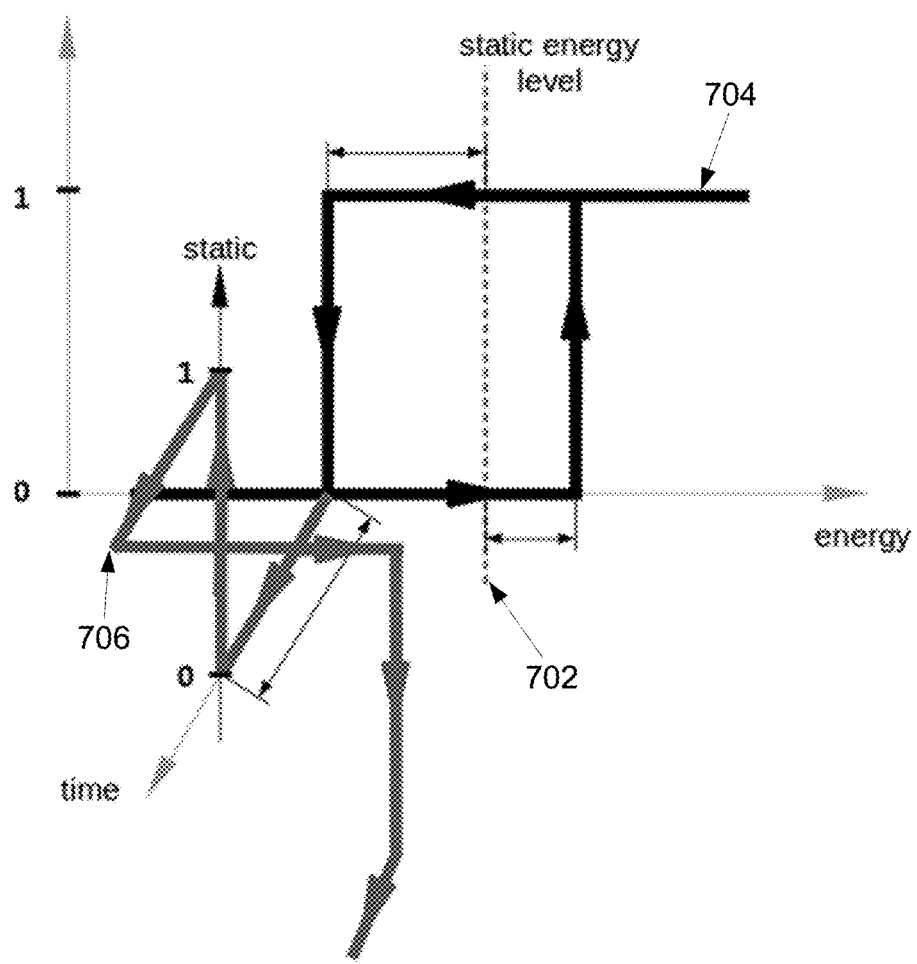
FIG. 7 shows a hysteresis-type threshold for determining whether a swing boom is static or moving, in accordance with one or more embodiments.

In practice, a single threshold is not ideal. The threshold will be more robust if it is replaced with a hysteresis-type threshold. FIG. 7 shows a graph 700 of behavior of the proposed hysteresis along 3 axes, in accordance with one or more embodiments. A decision of $H_0$ that the swing boom is moving is made only if the signal energy 704 satisfies (e.g., exceeds or becomes less than) certain predetermined factors of the threshold 702 and a decision of $H_1$ that the swing boom is static is made only if the signal energy 704 does not satisfy (e.g., does not exceed or become less than) the predetermined factors of the threshold 702. The factors $\beta_{dynamic}$ and $\beta_{static}$ may be different for the upper and lower thresholds ($\beta_{dynamic}\gamma$ and $\beta_{static}\gamma$). Moreover, the signal energy is only considered to be less than the lower threshold if the signal stays below the factor of the threshold for a certain predetermined amount of time. Graph 700 shows portion 706 of the signal below threshold 702 and the swing boom is determined to be static after the predetermined amount of time. This behavior is meant to make the system sensitive to motions of a certain magnitude while trying to decrease the number of false alarms.

In one embodiment, in addition to the comparison of the signal energy to the hysteresis-type threshold, in order to handle the situation where the signal energy is increasing not because of motion but due to increase in noise, the zero-crossing rate $Z_\omega$ for a batch of size N is calculated as follows:

$$Z_\omega = \sum_{k=1}^{N} |sgn(\omega_k) - sgn(\omega_{k-1})|$$

$Z_\omega$ is then compared with two thresholds $T_{ZCR,low}$ and $T_{ZCR,high}$. The signal is decided as dynamic if $Z\omega > T_{ZCR,high}$ and as static if $z\omega < T_{ZCR,low}$. The two decisions are combined to form the final decision $H_0$ or $H_1$ as a combination of both energy being low (for the predetermined amount of time) and zero crossing being lower than a threshold.

By determining whether the swing boom is static (i.e., the swing angle is not changing) or moving (i.e., the swing angle is changing), a Kalman filter may calculate an estimated swing angle of the swing boom by either 1) correcting the received sensor data based on an observed swing angle and calculating the estimated swing angled based on the corrected sensor data in response to determining that the swing boom is static (step 606), or 2) calculating the estimated swing angle based on the received sensor data in response to determining that the swing boom is moving (step 608). The calculation of the estimated swing angle based on whether the swing boom is determined to be static or moving is illustrated by state machine 800 of FIG. 8. The Kalman filter is simply a one-dimensional observer for bias of the difference between body and swing gyroscope rates around the Z axis (assuming that the only source of error is relative bias random walk):

$$\begin{pmatrix} \dot{\vartheta} \\ \dot{b} \end{pmatrix} = \begin{pmatrix} 0 & 0 \\ -1 & 0 \end{pmatrix} \begin{pmatrix} \vartheta \\ b \end{pmatrix} + \begin{pmatrix} 1 \\ 0 \end{pmatrix} \Delta \omega_z + v, \quad v \sim N\left(0, \begin{pmatrix} \sigma_\omega^2 & 0 \\ 0 & \sigma_b^2 \end{pmatrix}\right).$$

Figure 8:
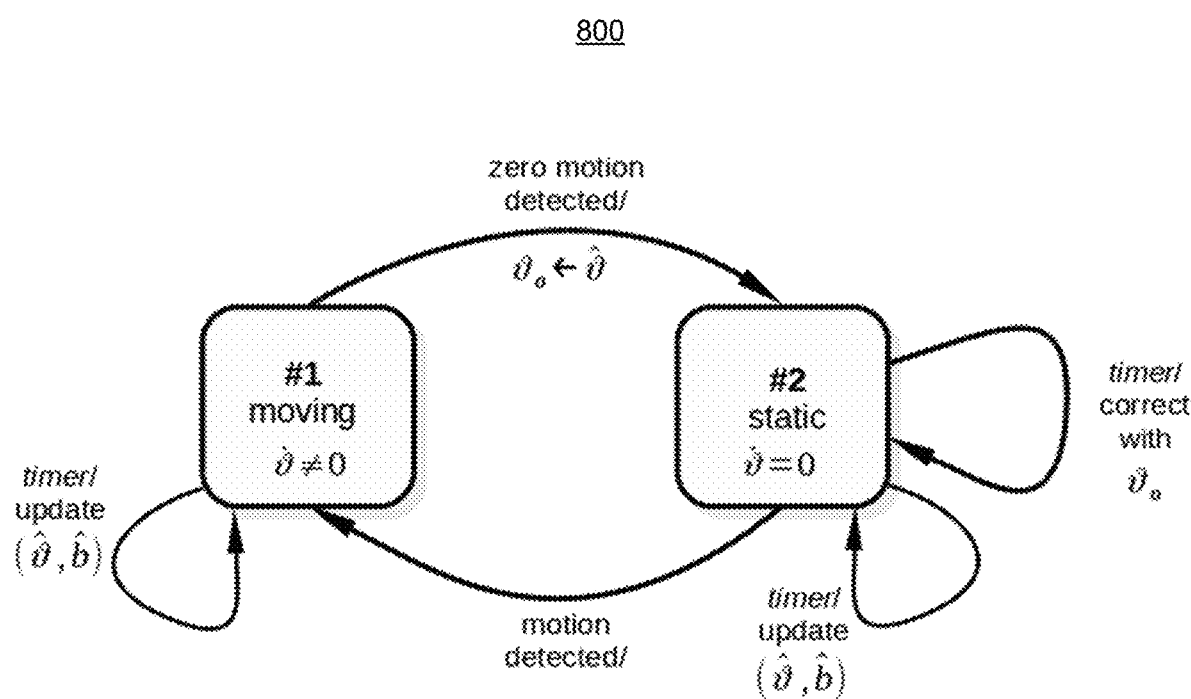
FIG. 8 shows a state machine for determining a swing angle of a swing boom of a vehicle, in accordance with one or more embodiments.

Corrections work according to a two-state state machine, shown in FIG. 8. When in state #1, angle of the swing joint is changing and the filter will keep integrating the gyroscope input. When in state #2, angle observations $\vartheta_o$ are used to remove the bias and correct the estimate as well.

$$\vartheta_o = H\begin{pmatrix}\vartheta\\b\end{pmatrix} + \varepsilon,$$

$$1{:}H = (0\ \ 0)$$
$$2{:}H = (1\ \ 0).$$

FIG. 8 shows a state machine 800 for determining a swing angle of a swing boom of a vehicle, in accordance with one or more embodiments. State machine 800 comprises state #1 corresponding to the swing boom moving relative to the body of the vehicle and state #2 corresponding to the swing joint being static relative to the body. When state machine 800 is at state #1 and it is determined that the swing boom is static (i.e., zero motion detected), state machine 800 transitions from state #1 to state #2. When state machine 100 is at state #2 and it is determined that the swing boom is moving (i.e., motion detected), state machine 800 transitions from state #2 to state #1. At state #1, the estimated swing angle $\vartheta$ is calculated based on the received sensor data. At state #2, the received sensor data is corrected with an observed swing angle $\vartheta_o$ and the estimated swing angle $\vartheta$ is calculated based on the corrected sensor data.

At step 606 of FIG. 6, in response to determining that the swing boom is static, the received sensor data is corrected based on an observed swing angle and an estimated swing angle is calculated based on the corrected sensor data. As shown in FIG. 4, the observed swing angle $\vartheta_o$ may be received from slope estimation module 408, rotation axis estimation module 412, and/or error estimation module 414. The received sensor data is corrected to remove bias by comparing the observed swing angle $\vartheta_o$ with a last estimated swing angle $\vartheta_s$. The estimated swing angle $\vartheta$ is then calculated using a Kalman filter based on the corrected sensor data by, for example, integrating the difference between the angular velocities of the swing boom and the body.

In one example, as shown in FIG. 5, when ZMD 512 determines that the swing joint is static, gate 516 activates to input the last estimated swing angle $\vartheta_s$ 518 into 1D angle Kalman filter (KF) 510, which corrects the sensor data by comparing the last estimated swing angle $\vartheta_s$ 518 with the observed swing angle $\vartheta_o$ and calculating the estimated swing angle $\vartheta$ based on the corrected sensor data. When ZMD 512 determines that the swing boom transitions from a moving state to a static state, gate 514 activates to update last estimated swing angle $\vartheta_s$ 518 with the estimated swing angle 19. In the context of the Kalman filter, observed swing angles $\vartheta_o$ are typically not reliable. The gyroscopes are integrated to calculate the estimated swing angle $\vartheta$, however due to noise and drive observations are needed from time to time. Accordingly, the observed swing angles $\vartheta_o$ are combined with the last estimated swing angle $\vartheta_s$ 518 to calculate estimated swing angle $\vartheta$.

At step 608 of FIG. 6, in response to determining that the swing joint is moving, the estimated swing angle is calculated based on the received sensor data. The estimated swing angle $\vartheta$ is calculated using a Kalman filter based on the received sensor data by, for example, integrating the difference between the angular velocities of the swing boom and the body. In one example, as shown in FIG. 5, when ZMD 512 determines that the swing joint is static, angle KF 510 calculates the estimated swing angle $\vartheta$ by, e.g., integrating the difference between the angular velocity of the swing and the angular velocity of the swing boom as output by summer 508.

In some embodiments, where the estimated swing angle $\vartheta$ exceeds the swing limits of the vehicle, the Kalman filter may be reset. For example, as shown in FIG. 5, when limit detector 520 determines that estimated swing angle $\vartheta$ exceeds the swing limits of the vehicle, angle KF 510 is reset. The limits are set by limit calibrator 522, e.g., according to workflow 300 of FIG. 3. Resetting the Kalman filter refers to manually setting the values of the state of the Kalman filter. When hitting a swing limit, it is known what the correct state is and therefore the state can be updated directly.

At step 610 of FIG. 6, the estimated swing angle is output. For example, the estimated swing angle can be output by displaying the estimated swing angle on a display device of a computer system, storing the estimated swing angle on a memory or storage of a computer system, or by transmitting the estimated swing angle to a remote computer system. In one example, the estimated swing angle is output on user interface 900 shown in FIG. 9. In another example, as shown in FIG. 4, the estimated swing angle $\vartheta$ may be output by kinematic angle estimation module 406 to error estimation module 414 for generating the observed swing angles $\vartheta_o$.

Figure 9:
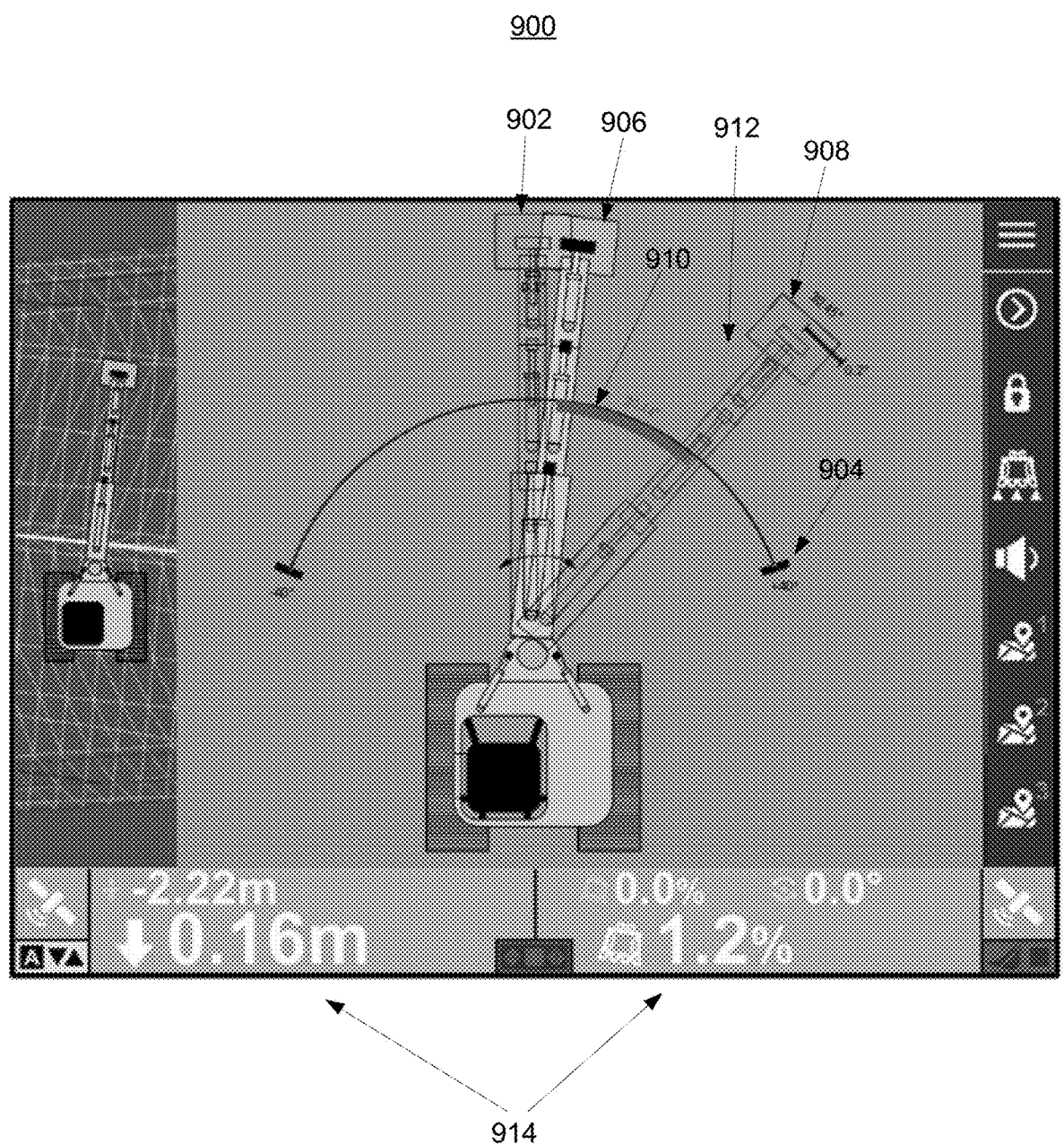
FIG. 9 shows an exemplary user interface, in accordance with one or more embodiments.

FIG. 9 shows an exemplary user interface 900, in accordance with one or more embodiments. User interface 900 may be presented to a user, such as, e.g., an operator of an excavator (or any other suitable vehicle). As shown in FIG. 9, user interface 900 depicts a layout 902 of the swing boom of the excavator at zero pose, which visually halves the full ranges of the swing limits and helps with initialization. Swing limits 904 of the swing boom are shown to be, e.g., ±40°. User interface 900 may also depict work directions shown by lines defined by the user, which can be helpful when slewing and swinging the swing boom to align the swing boom with one of the directions.

The current estimated position 906 of the swing boom determined based on the current estimated swing angle and the current observed position 908 of the swing boom determined based on the current observed swing angle are also shown in user interface 900. Various parameters 914 (e.g., Cartesian bucket position) may be updated according to the estimated swing angle. The current observed position 908 of the swing boom is shown as an outline. The current observed position 908 indicates where the system believes the swing boom should be located. As shown in FIG. 9, the current observed position 908 is very close to the current estimated position 906 of the swing boom and does not have to be the same. This is because the estimated swing angle does correspond to the observed swing angle, but rather the observed swing angles are used to correct gyroscope bias according to the parameters of the Kalman filter. At initialization time, the current observed position 908 and the current estimated position 906 may be very far apart. As the operator operates the vehicle, the current observed position 908 and the current estimated position 906 would converge. A graded band 910 may be shown depicting the error between the current estimated position 906 and the current observed position 908. The graded band 910 may be color coded (e.g., green, yellow, red) for each grade and the limits of each grade may be defined by the user. A pie-shaped variance indicator 912 may be shown such that the size of indicator 912 indicates the variance by which the current observed position 908 changes. Accordingly, the larger indicator 912 is, the larger the variance and the larger the uncertainty of the current observed position 908, and consequently the current estimated position 906. User interface 900 may also depict an indicator that informs the operator of the state in which the excavator is in. The state goes beyond an indicator of normal and faulty situations, and includes sub-states of the online state (e.g., latched or chasing). In summary, user interface 900 is designed to keep the operator informed of any reduction in accuracy that might occur at run time. An alternative would have been an on-off indicator of low or high accuracy.

Rotation Axis Estimation

During operation, the body of the vehicle experiences slight oscillations when the boom swing is moving as a result of, e.g., actuation of the boom, stick, or bucket pitch, as well as bucket tilt. Such oscillations are sufficient for determining observed swing angles observations $\vartheta_o$. A rotation axis estimation algorithm may be performed by rotation axis estimation module 412 of FIG. 4 for determining observed swing angles observations $\vartheta_o$.

According to the assumptions made above, at any given time, at a fixed swing angle, the swing and body IMUs can be considered to be attached to the same rigid body, but one is rotated with respect to the other. The basic idea is to measure, while the rigid body is in motion, an entity that is sensed by both of them but with observable difference in their output, the difference being proportional to the angle. The motion has considerable components orthogonal to the rotation axis. However, there is no legitimate motion of the rigid body (i.e., the excavator cabin). In other words, during operation, the excavator will remain in one place and only the arm will be in motion. The cabin and swing motions are parallel to the rotation axis. Therefore, designed maneuvers cannot be relied upon.

Figure 10:
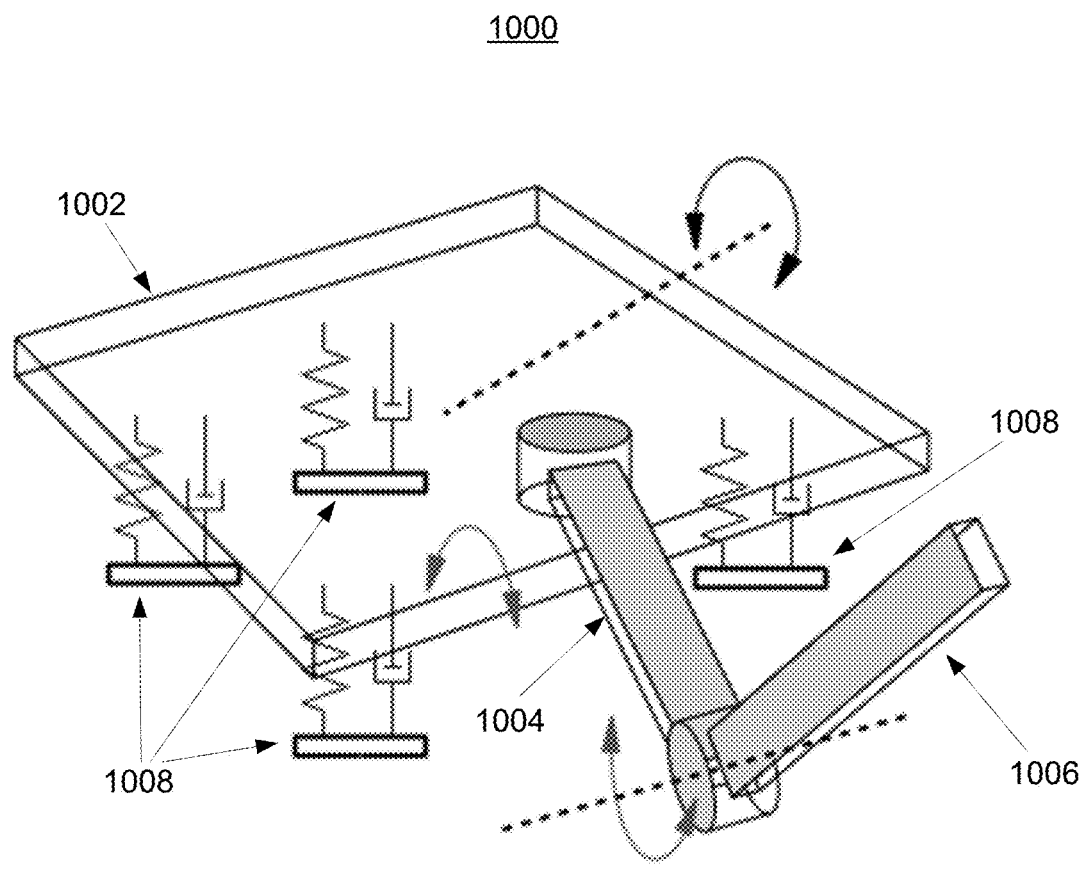
FIG. 10 shows a model of an excavator, in accordance with one or more embodiments.

FIG. 10 shows a simplified model 1000 of an excavator, in accordance with one or more embodiments. Model 1000 of the excavator starts with a body link 1002 as the first link of the kinematic chain, continuing to a swing link 1004, and ending at the boom link 1006. Body link 1002 models the chassis and the tracks of the excavator by a rigid body connected to the ground through lumped spring-damper elements 1008. Any change in torque applied at the joints will result in a damped oscillation of the body. This is more prominent at the end of the hydraulic piston travel (when the hydraulic valve closes and the mechanism suddenly stops), after which the situation is very similar to the free oscillation of a car chassis after braking. This effect can be easily seen (and felt) by a jab at the operator's joystick. This phenomenon can be modeled as decaying free oscillation of an oscillatory structure subsequent to an impulse loading.

Figure 11:
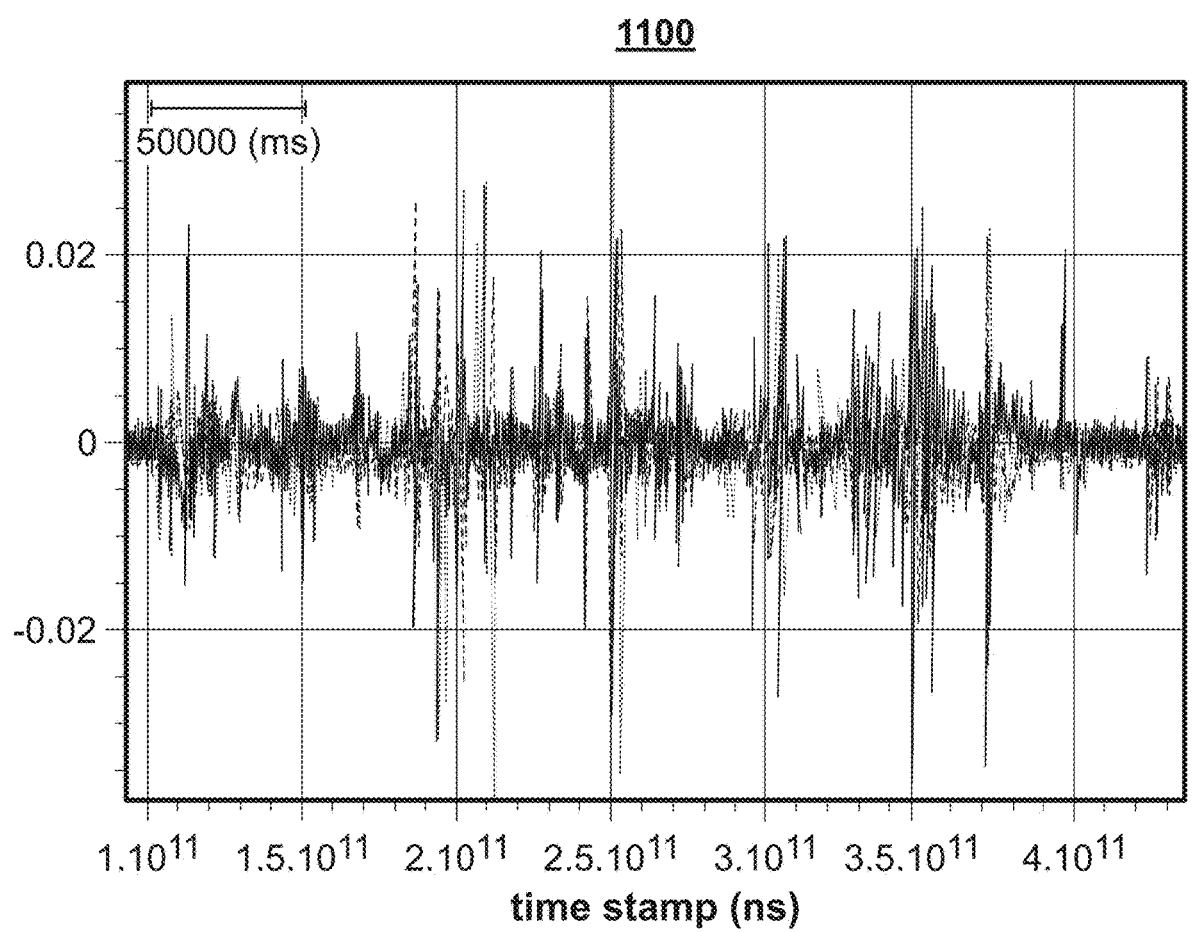
FIG. 11 shows a graph of raw gyroscope signals recorded on an excavator, in accordance with one or more embodiments.
Figure 12:
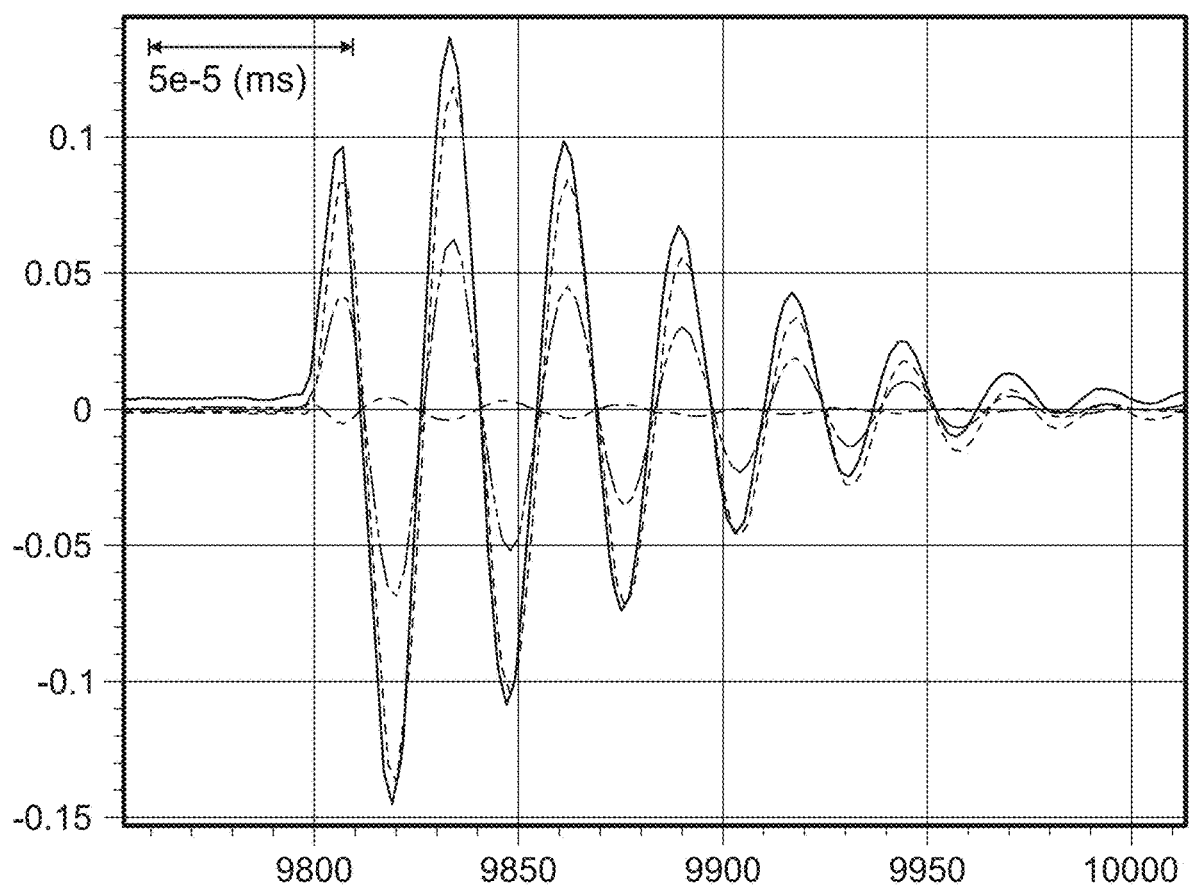
FIG. 12 shows another graph of raw gyroscope signals, in accordance with one or more embodiments.
Figure 13:
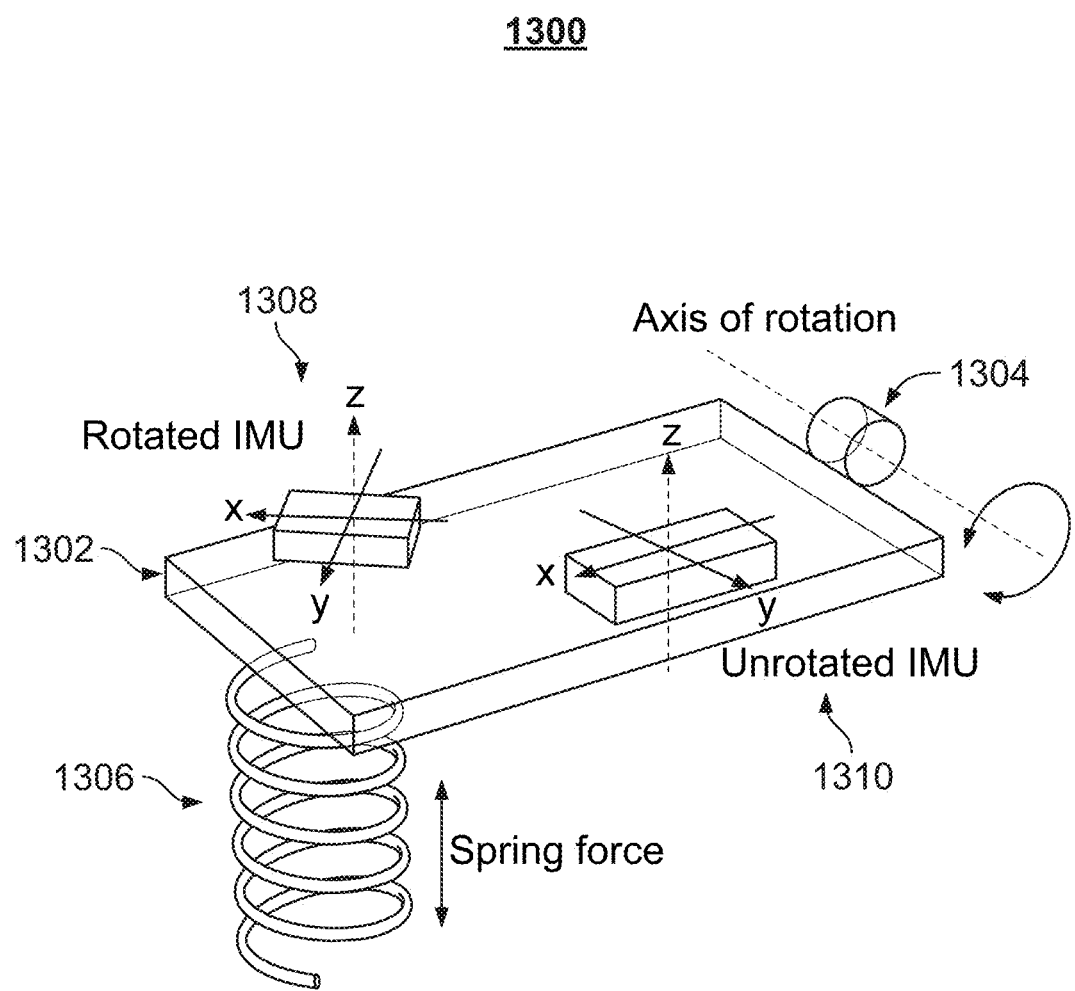
FIG. 13 shows a model of a test apparatus, in accordance with one or more embodiments.

To illustrate, FIG. 11 shows a graph 1100 of raw gyroscope signals recorded from an actual machine run, in accordance with one or more embodiments. Despite the considerable noise in the signals, there are spots that clearly correspond to oscillations, as FIG. 11 shows. In these segments, the SNR (signal-to-noise ratio) drastically changes to become acceptable sources for observations while the rest of the signals suffer from very poor quality, making them almost indistinguishable from noise. FIG. 12 shows a graph 1200 of gyroscope signals captured by two IMUs attached to the same rigid platform, one rotated with respect to the other, implemented in a test apparatus, in accordance with one or more embodiments. FIG. 13 shows a model 1300 of the test apparatus, in accordance with one or more embodiments. Model 1300 of the test apparatus comprises IMUs 1308 and 1310 disposed on platform 1302, where IMU 1308 is rotated with respect to IMU 1310. Platform 1302 is supported by a rod 1304 at one end, to which it is connected through a tilting joint, and a spring 1306 at the other end.

The rationale behind the test apparatus is to make sure that motion of the platform 1302 only happens around a fixed axis of rotation. Similarity between the signals would then confirm that arm operation causes the excavator body to also oscillate around a more or less fixed rotation axis. It can then be concluded that the IMUs 1308 and 1310 provide information about this axis. However, while the unrotated IMU 1310 will only register motion around its Y axis (the platform's rotation axis), the rotated IMU 1308 will see motion around all of its axes, representing oscillation around the same rotation axis expressed in its own local coordinate frame.

A simple and effective rotation axis estimation algorithm is implemented to identify a constant rotation axis from raw gyroscopic measurements. For a batch of N measurements of the gyroscope rates $\vec{\omega}_k = (\omega_{x,k}\ \omega_{y,k}\ \omega_{z,k})^T$, the rotation axis is given by $$\vec{u} = \frac{1}{\|\vec{\psi}\|}\vec{\psi}, \text{ where } \vec{\psi} = \Delta T \vec{\omega} = \frac{\Delta T}{N} \sum_{k=1}^{N} \begin{pmatrix} \omega_{x,k} \\ \omega_{y,k} \\ \omega_{z,k} \end{pmatrix}.$$

Averaging calls for fast enough rates works well. However, at close to zero rates, or when crossing zero, the algorithm will not work. A median operation has been proposed, where the normalized sample is first represented in spherical coordinates:

$$\vec{u}_k = \frac{\vec{\omega}_k}{\|\vec{\omega}_k\|} = \begin{pmatrix} \sin(\beta_k)\cos(\alpha_k) \\ \sin(\beta_k)\sin(\alpha_k) \\ \cos(\beta_k) \end{pmatrix}, \text{ where } \begin{array}{l} \alpha_k = \arctan\left(\frac{u_{y,k}}{u_{x,k}}\right). \\ \beta_k = \arccos(u_{z,k}) \end{array}$$

The rotation axis is then computed as $$\vec{u} = \begin{pmatrix} \sin(\bar{\beta})\cos(\bar{\alpha}) \\ \sin(\bar{\beta})\sin(\bar{\alpha}) \\ \cos(\bar{\beta}) \end{pmatrix},$$

where $\bar{\alpha}$ and $\bar{\beta}$ denote medians.

Figure 14:
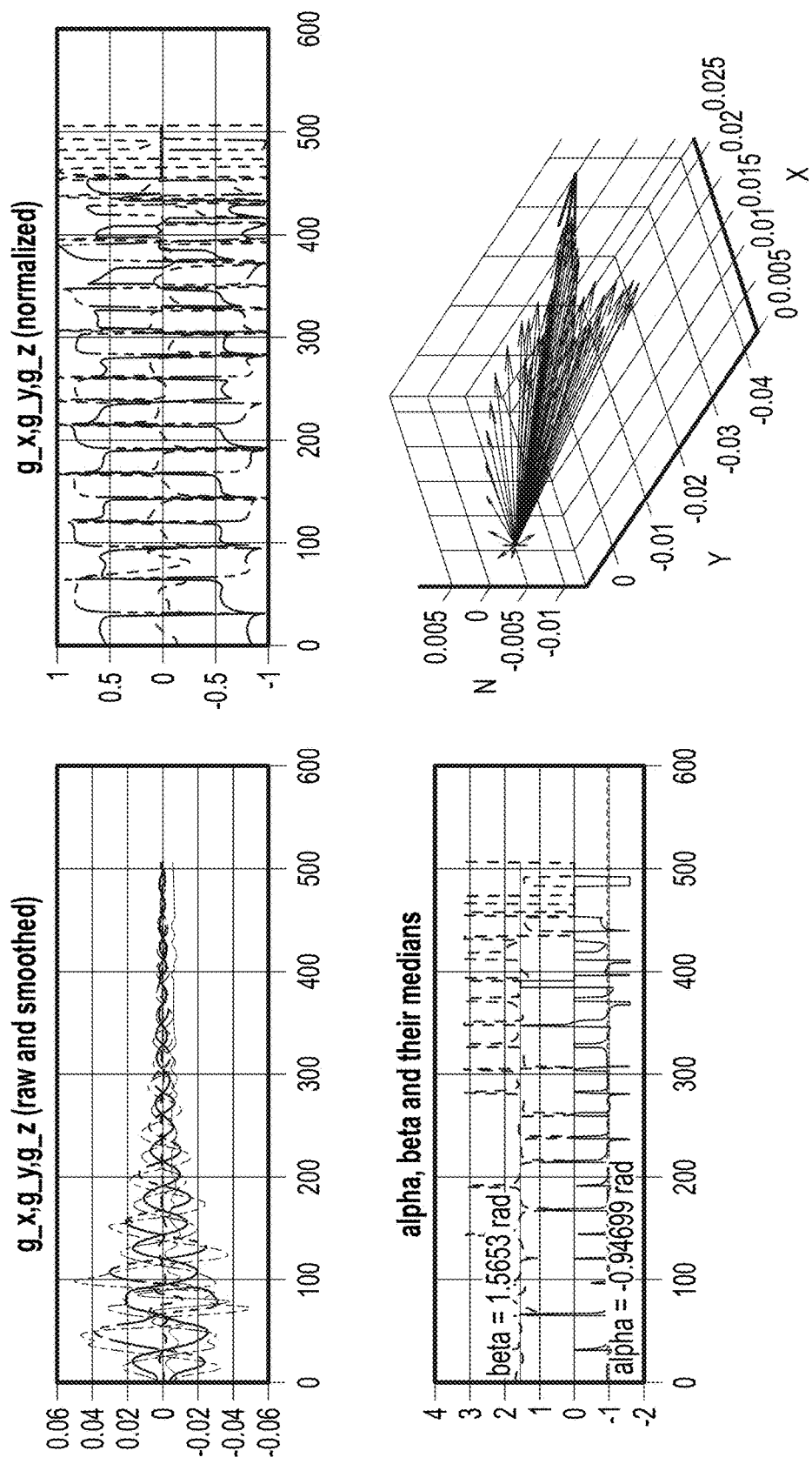
FIG. 14 shows graphs of an example of an output of the rotation axis estimation algorithm on a damped oscillation, in accordance with one or more embodiments.
Figure 15:
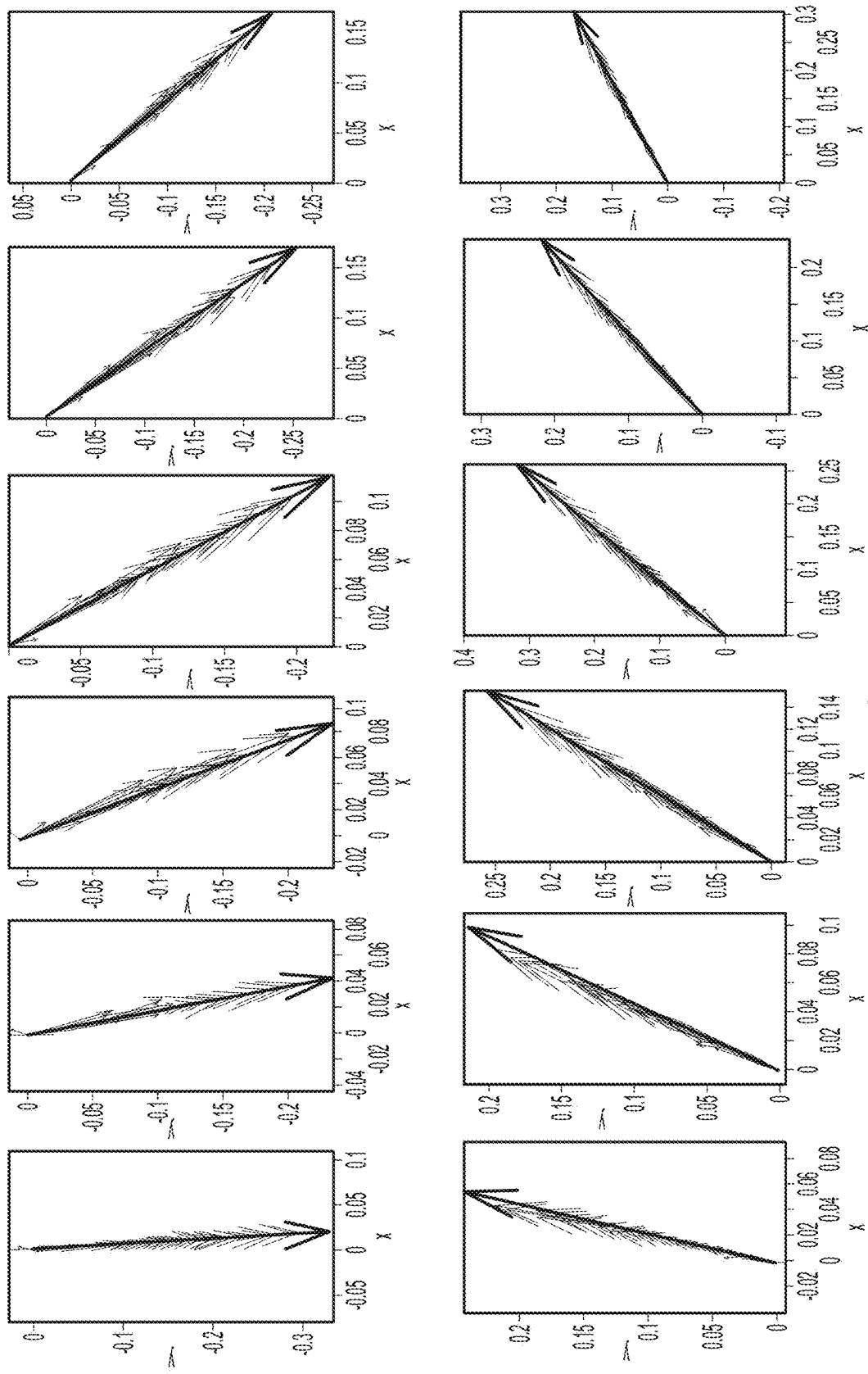
FIG. 15 shows graphs depicting the change in rotation axis as the swing IMU is rotated, in accordance with one or more embodiments.
Figure 16:
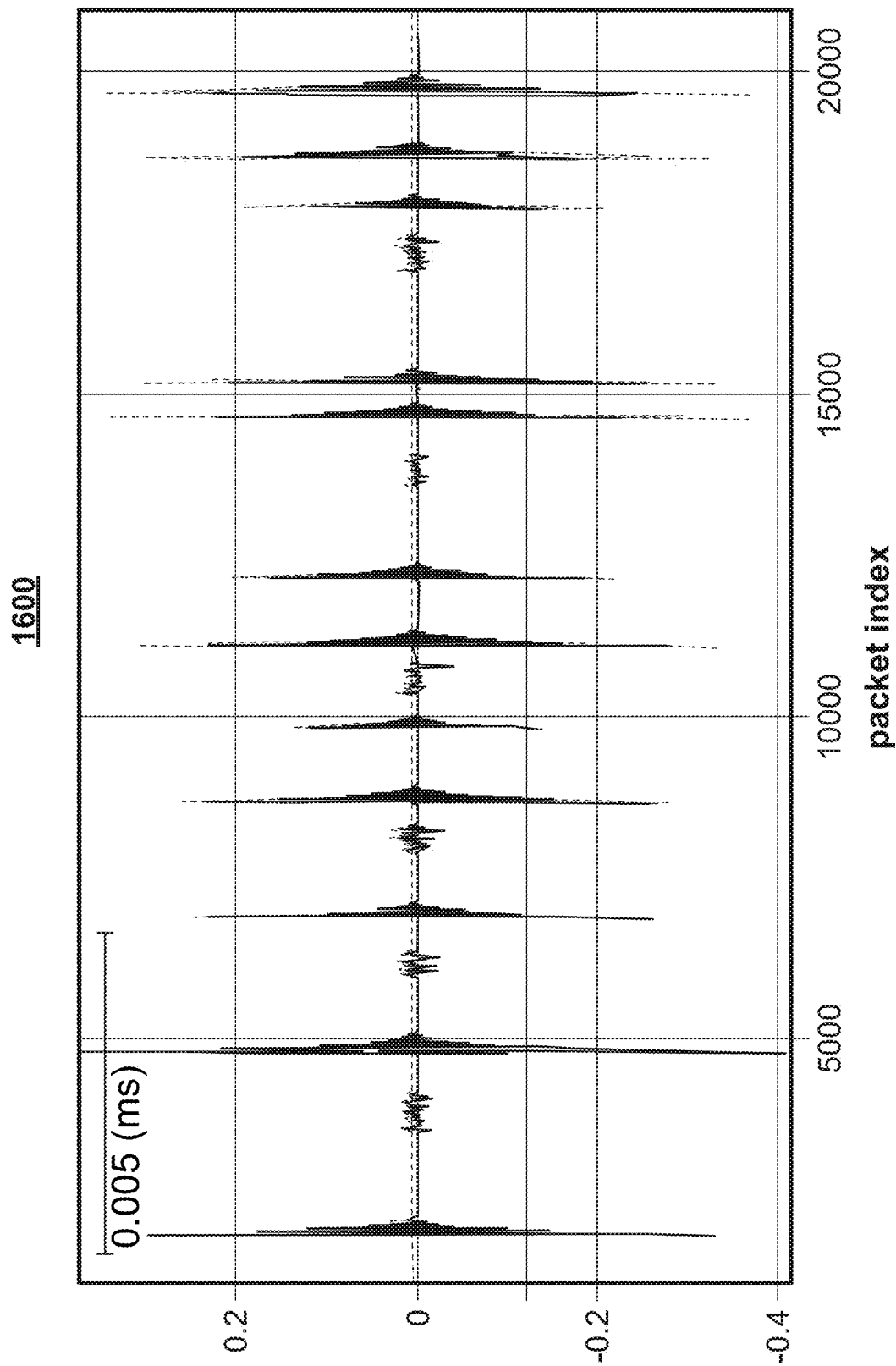
FIG. 16 shows a plot of the signals for computing the rotation axis, in accordance with one or more embodiments.

FIG. 14 shows graphs 1400 of an example of the output of the rotation axis estimation algorithm on a damped oscillation, in accordance with one or more embodiments. FIG. 15 shows graphs 1500 depicting the change in rotation axis as the swing IMU is rotated, in accordance with one or more embodiments. To produce graphs 1500, the angle is changed incrementally and then the device is made to oscillate. This would create clean signals that can be closely modeled as damped oscillations, with oscillatory parts separated from each other. FIG. 16 shows a plot 1600 of the signals for computing the rotation axis, in accordance with one or more embodiments.

The rotation axis estimation algorithm assumes that the rotation axis will stay constant over a certain long enough interval. Although the test apparatus can produce these easily with carefully planned excitation, on a real machine, the signal to noise ratio is low and oscillations overlap random noisy changes in the rotation axis. There are a number of strategies for identification of oscillations in time series.

A number of approaches exist for identifying whether a signal is oscillatory or not, as well as computing amplitudes and frequencies of those vibrations. At interest here is not in the vibrations per se, but in the oscillations as they are the best representation of body motion. In all other times, body motion is at the level of noise. Fourier analysis can, in principle, be used to estimate components of a general signal. However, curve fitting methods are more suited to estimating properties (e.g., amplitude, frequency, phase, damping) of a single sinusoidal component. Such methods try to find parameters of the function of the following form that best matches the given signal (segment):

$$f(k) = \alpha e^{\lambda k} \sin(\omega k + \beta) + b \quad \text{Equation (1)}$$

where $\alpha$, $\lambda$, $\omega$, $\beta$, and b respectively denote amplitude, damping rate, frequency, phase, and offset. Note that this function does not model the chirp effect and that adding more harmonics might better describe the signal. Other methods that aim to identify parameters (e.g., stiffness k, damping c, and mass m) of the lumped mass-spring-damper physical system (or model thereof) produce the oscillations as follows:

$$m\ddot{x}(t) + c\dot{x}(t) + kx(t) = 0.$$

Figure 17:
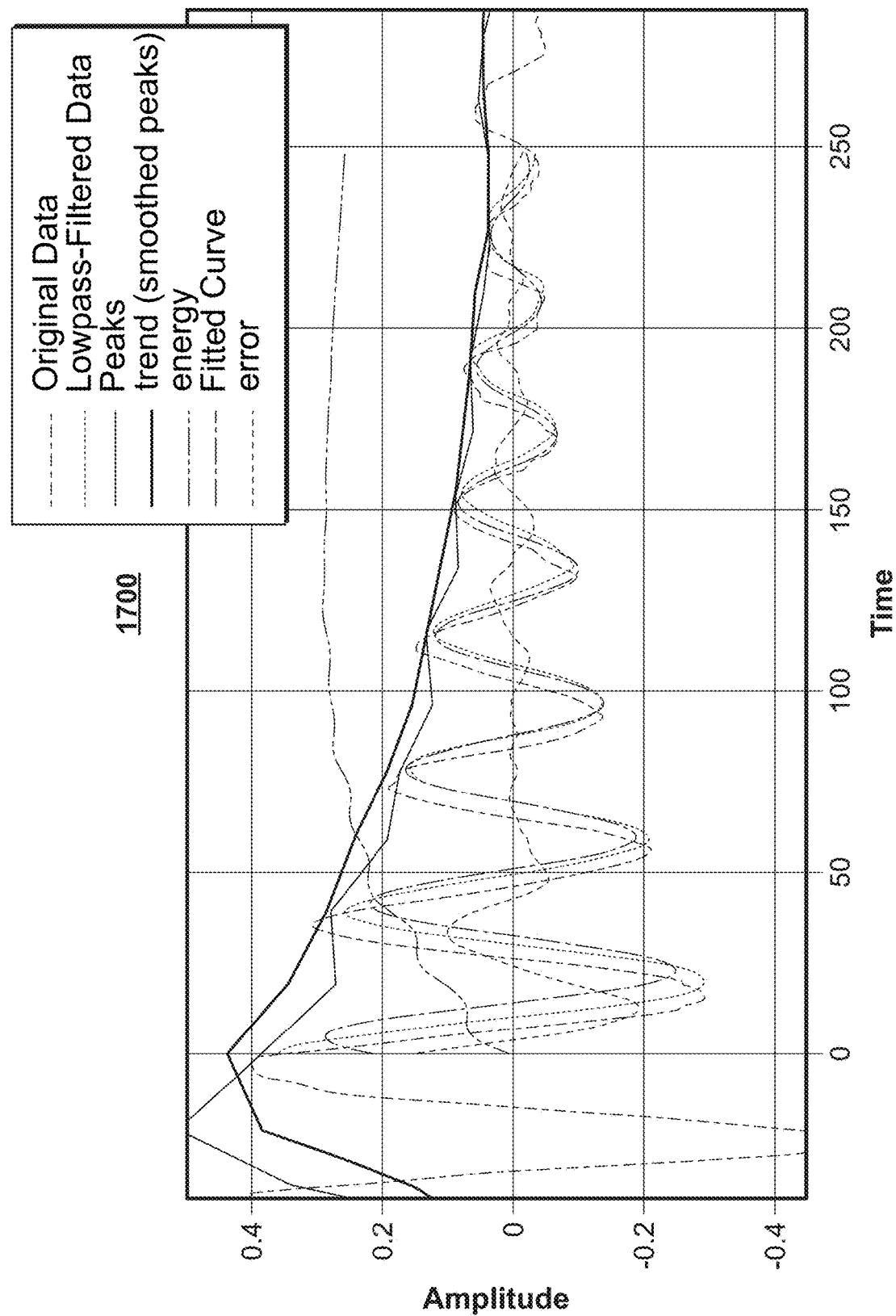
FIG. 17 shows a graph of an example of fitting s to the function $f$, in accordance with one or more embodiments

Note that this equation describes a 1 DOF (degree of freedom) system. A more realistic model would be a set of these. However, the aim here is not to faithfully model but to identify certain patterns of behavior. No matter what method is used, it certainly helps to pre-process the signal and extract the promising parts for further identification. The following pre-processing steps may performed:

1) Store the last N samples in a buffer. Denote it by $\{s(k), k=1, \ldots, N\}$.
2) Detrend it s.
3) Normalize it using max(s) and min(s).
4) Find the peaks.
5) Search for the biggest peak.
6) Remove the samples before this peak.
7) Starting from the first sample, go towards the end of the buffer until a bigger peak is found.
8) Remove the remaining samples at the end. Reindex the buffer: $\{s(k), k=1, \ldots, M\}$.
9) Find zero crossings.
10) Estimate the period p of the oscillation as twice the average distance between two consecutive zero crossings.
11) Use an optimizer to fit s to the function $f$ defined in Equation (1). For initial values of $\alpha$, $\lambda$, $\omega$, $\beta$, and b, the following may be respectively chosen: $|\max(s) - \min(s)|$, $0.1$, $2\pi/p$, and $\tilde{s}$(average of the buffer). FIG. 17 shows a graph 1700 of an example of fitting s to the function $f$, in accordance with one or more embodiments.

Given the estimate of the rotation axes of both the body and the swing boom of the vehicle, the observed swing angle is calculated as:

$$\hat{\vartheta} = \arcsin\left(\frac{\vec{u}_{swing} \cdot \vec{u}_{body}}{\|\vec{u}_{swing} \cdot \vec{u}_{body}\|}\right) \text{sign}(\alpha_{swing}).$$

The rotation axis estimation algorithm described above is extremely sensitive to noise. In experiments, it has been found that angles less than a certain value (e.g., 25 degrees) cannot be handled by this method as the component of gyroscopic rate on one axis becomes as small as the noise itself. Therefore, in accordance with some embodiments, other approaches for determining of angle observations may be performed.

Error Estimation

Figure 18:
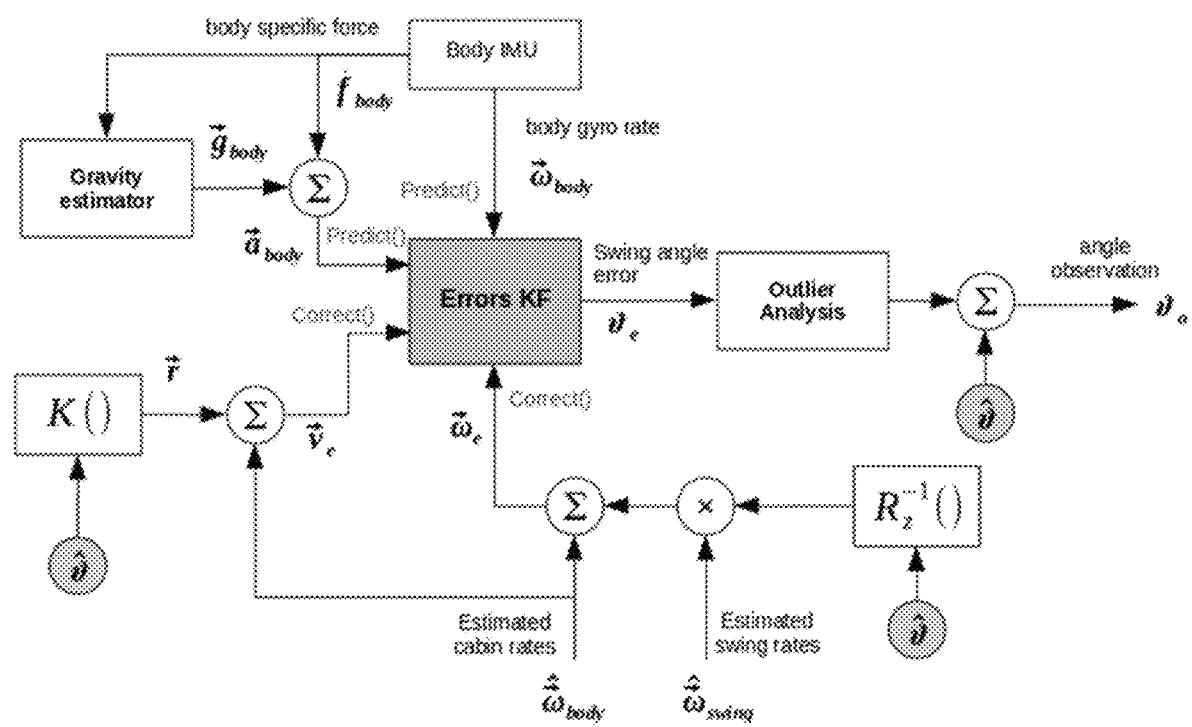
FIG. 18 shows a schematic diagram of an error estimation module, in accordance with one or more embodiments.

FIG. 18 shows a schematic diagram of an error estimation module 1800, in accordance with one or more embodiments.

In one example, error estimation module 1800 is error estimation module 414 in FIG. 4.

Error estimation is performed by transfer alignment. Transfer alignment is a set of methods to aligned two sensors such as, e.g., IMUs, one being denoted the master sensor and the other being denoted the slave sensor. Transfer alignment operates by comparing, e.g., comparing angular rates, velocities, accelerations, etc. measured by the master and slave units. Error estimation by transfer alignment will be applied to calculate observed swing angles $\vartheta_0$ where 1) angular errors are large (e.g., up to 40 degrees) and not typically considered misalignments, and 2) the vehicle cannot perform any designed maneuvers.

The body sensor disposed on the body will be denoted the master while the swing sensor disposed on the swing boom will be denoted the slave. The alignment error will be defined with respect to the pitch, roll, and yaw of the swing boom relative to the body. $R_{swing}^{body}$ evolves according to the following differential equation:

$$\dot{R}_{swing}^{body} = R_{swing}^{body} \Omega_{swing}^{body} \text{ where}$$

$$\Omega_{swing}^{body} = \begin{pmatrix} 0 & \omega_{z,swing}^{body} & -\omega_{y,swing}^{body} \\ -\omega_{z,swing}^{body} & 0 & \omega_{x,swing}^{body} \\ \omega_{y,swing}^{body} & -\omega_{x,swing}^{body} & 0 \end{pmatrix}$$

and where $\Omega_{swing}^{body}$ is a skew-symmetric matrix composed of gyroscope rates of the boom swing with respect to the body and $$\vec{\omega}_{swing}^{body} = \vec{\omega}_{swing}^{swing} - \vec{\omega}_{body}^{body} = \vec{\omega}_{swing} - \vec{\omega}_{body}.$$

Transfer alignment assumes small angle misalignments $$\hat{R}_{swing}^{body} = (I - \Psi_{attitude}) R_{swing}^{body} \quad \text{(Equation 2)}$$

where I is the identity matrix and $\Psi_{attitude}$ is the skew symmetric matrix whose off-diagonal elements are attitude errors:

$$\Psi_{attitude} = \begin{pmatrix} 0 & -\delta\theta & -\delta\varphi \\ \delta\theta & 0 & -\delta\psi \\ -\delta\varphi & \delta\psi & 0 \end{pmatrix}$$

It can be shown that the errors evolve (propagate) according to the following differential equation:

$$\dot{\vec{\psi}}_{att} = -\omega_{body} \times \vec{\psi}_{att} - R^{body}{}_{swing} \vec{\delta\omega}_{swing} + \vec{\delta\omega}_{body}$$

where x denotes the vector cross product operations, $\vec{\psi}_{att} = (\delta\psi \delta\varphi \delta\theta)^T$ is the error vectors, and the gyroscope errors are given by:

$$\vec{\delta\omega}_{swing} = \vec{\hat{\omega}}_{swing} - \vec{\omega}_{swing}$$

$$\vec{\delta\omega}_{body} = \vec{\hat{\omega}}_{body} - \vec{\omega}_{body} \quad \text{(Equation 3)}$$

A similar result can be derived using accelerometer readings:

$$\dot{\vec{v}}_{body} = R_{swing}^{body} \vec{f}_{swing} - \vec{g}$$

where $\vec{v}_{body}$ is the linear velocity vector of the vehicle (i.e., the tracks), $\vec{f}_{swing}$ is the specific force measured by the IMU disposed on the swing boom (accelerometer output), and $\vec{g}$ denotes the gravity vector in the body frame. It can be shown that the following differential equation governs propagation:

$$\delta\vec{\psi}_{vel} = f_{body} \times \vec{\psi}_{vel} + R_{swing}{}^{body} \delta\vec{f}_{swing}$$

where $\delta\vec{\psi}_{vel} = (\delta v_x \delta v_y \delta v_z)^T$ represents errors in the velocity calculation, $\vec{f}_{swing}$ is the acceleration of the vehicle measured by the IMU disposed on the body of the vehicle, and $\delta\vec{f}_{swing} = \vec{f}_{swing} - \hat{\vec{f}}_{swing}$ is the difference between the true and measured accelerations.

This formulation lends itself to the Kalman filter implementation. For this purpose, the following assumptions are made: 1) body rates errors are assumed to be zero (i.e., $\delta\vec{\omega}_{body}=0$) swing rate errors are modelled as Gaussian white noise (i.e., $\delta\vec{\omega}_{swing} \sim N(0, \sigma_{\omega,swing}^2 I_{3\times 3})$), and 3) swing accelerometer errors are modelled as Gaussian white noise (i.e., $\delta\vec{f}_{swing} \sim N(0, \sigma_{f,swing}^2 I_{3\times 3})$).

The state space model to be used by the Kalman filter is as follows:

$$\dot{x} = Fx + Gw, \quad w \sim N(0, W)$$

$$W = \begin{pmatrix} \sigma_{\omega,swing}^2 I_{3\times 3} & 0_{3\times 3} \\ 0_{3\times 3} & \sigma_{f,swing}^2 I_{3\times 3} \end{pmatrix}$$

where $x = (\delta\psi \delta\varphi \delta\theta \delta v_x \delta v_y \delta v_z)^T$ is the state vector, $w = (w_{gx} w_{gy} w_{gz} w_{ax} w_{ax} w_{ax})_T$ is the gyroscope and accelerometer noise components, and $$F = \begin{pmatrix} -\times \omega_{body} & 0_{3\times 3} \\ \times f_{body} & 0_{3\times 3} \end{pmatrix}$$

$$G = \begin{pmatrix} -R_{swing}^{body} & 0_{3\times 3} \\ 0_{3\times 3} & R_{swing}^{body} \end{pmatrix} \times \vec{q} \equiv \begin{pmatrix} 0 & -q_z & -q_y \\ q_z & 0 & -q_x \\ -q_y & q_x & 0 \end{pmatrix}$$

Discretizing the above results in $$x_{k+1} = \Phi_k x_k + w_k, \quad w \sim N(0, GWG^T)$$

$$\Phi_k = \exp(F_k \Delta t_k) = I + \Delta t_k F_k$$

The Kalman filter operates based on observations of state (velocity and rotation errors):

$$z_k = H_k x_k - v_k$$

where $v_k$ is a measurement of noise. Based on the observations that are available, $H_k$ may take many forms, including velocity matching and rate matching.

In velocity matching, a direct observation of $x_{\delta v} = (\delta v_x \delta v_y \delta v_z)^T$ is given by:

$$z_{\delta v} = \hat{v}_{swing} - \hat{v}_{body} = \omega_{body} \times \vec{r}$$

where $\vec{r}$ is the estimate of the vector from the body IMU to the swing IMU. It is a function of the estimated $\vartheta$ and fixed machine parameters (e.g., the distance from the body IMU to the swing joint and from the swing joint to the swing IMU). Thus, $$H_k = (0_{3\times 3} \vee I_{3\times 3}).$$

In rate matching, an observation of the difference between vehicle (body) rates, as calculated by the body IMU, and the ones estimated by the swing IMU, is:

$$z_{\delta\omega} = \omega_{swing} - \hat{R}_{swing}{}^{body} \hat{\omega}_{swing}$$

Using Equations 2 and 3, it can be shown that:

$$z_{\delta\omega} = -R_{swing}{}^{body} \omega_{swing} \times \psi_{att} - R_{swing}{}^{body} \delta\omega_{swing}$$

Modelling $R_{swing}{}^{body} \delta\omega_{swing}$ as white Gaussian noise, it can be seen that $$R_{swing}{}^{body} \delta\omega_{swing}$$

In this case, $v_k$ also includes flexure. In the context of an excavator, flexure is the unknown and unmodelled uncertainty due to mechanical slop in the swing joint.

Transfer alignment can also be performed based on attitude and acceleration matching. For the application of error estimation of the swing angle for excavators, a number of simplifications can be achieved. First, rate matching is preferred due to the fact that excavators rarely move and when they do move, the movement is not while the swing boom is being operated. Secondly, the Kalman filter is run during the time when the swing boom is not swinging and thus, $\omega_{z,swing}$ can be assumed to be almost zero.

Every time an error estimate is available, an observation $\vartheta_0$ for the kinematic filter is produced as the current swing angle estimate $\vartheta$ plus the error estimate in the Z axis:

$$\vartheta_0 = \vartheta + \delta\theta$$

Figure 19:
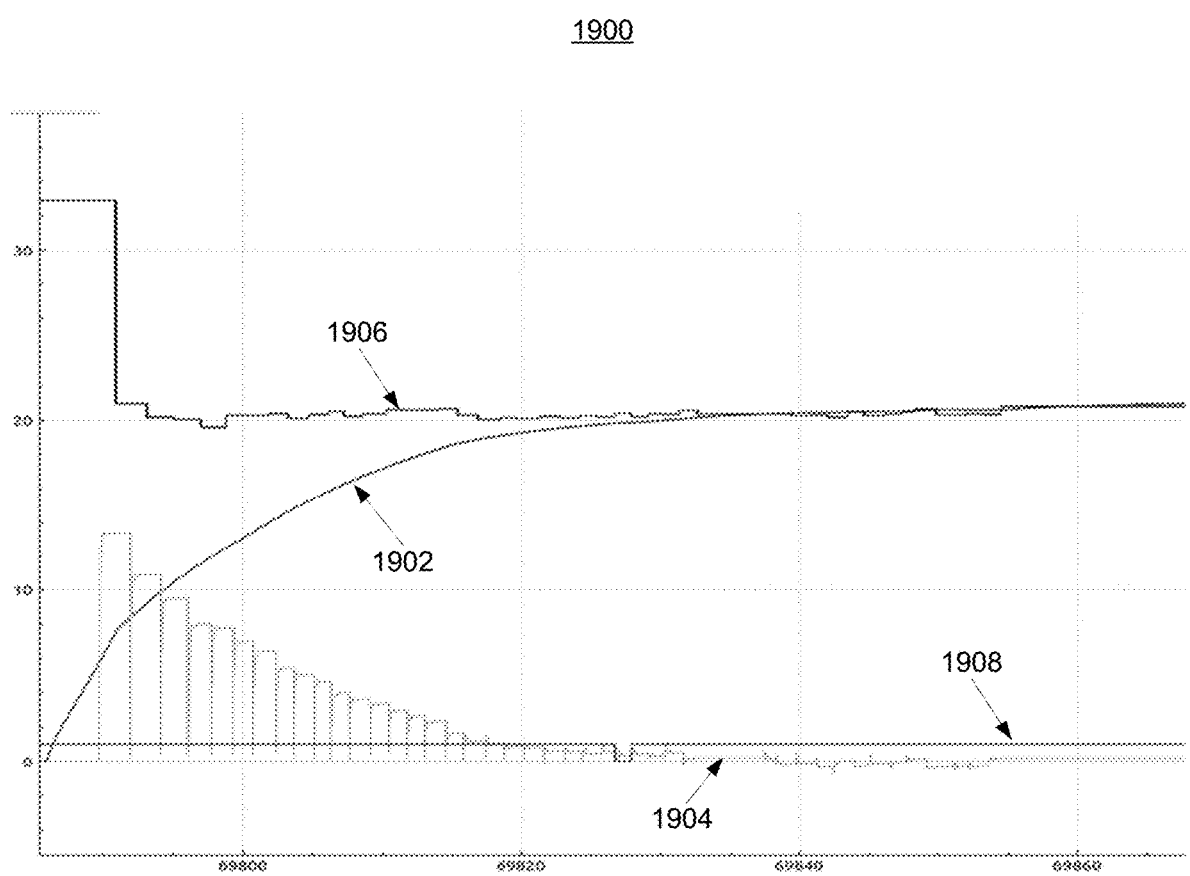
FIG. 19 shows a graph showing results of a transfer alignment, in accordance with one or more embodiments.

FIG. 19 shows a graph 1900 showing results of the transfer alignment, in accordance with one or more embodiments. Plot 1902 shows the swing joint angle, plot 1904 shows the swing angle error, plot 1906 shows the corrected swing joint angle, and plot 1908 shows a corrected swing angle error. Graph 1900 is generated by rotating the slave (swing) IMU by 20 degrees. As can be seen in graph 1900, transfer alignment filter converges to the true angle. Subsequent oscillations fluctuate the estate around the desired value.

The signal quality is not ideal setup. Moreover, oscillations do not come as well-separated chunks. Although transfer alignment is much more robust to noise and does not need to be fed good signals (such as the ones discussed for computing rotation axes), some precautions should be exercised. For example, it is assumed that the result of transfer alignment on a signal with very small magnitude or one that is too short would not be satisfactory and should be discarded. Even with these assumptions in place, the presence of outliers is inevitable. In addition, error variance can drag the estimate around unnecessarily.

It should be noted that the rationale for corrections is basically to prevent the gyroscope estimate from drifting. Therefore, to produce smoother estimates, strategies may be devised to remove outliers and to dynamically adapt the variances by which corrections are applied.

Robustness

This section explicitly addresses measures that help the system perform more smooth, stable, and robust.

Naturally, there is uncertainty regarding the observed swing angle $\vartheta_0$. This uncertainty is reflected in the RMS (root mean square) value $\varepsilon = \sigma_{\vartheta_0}$ used when correcting the kinematic angle filter. The RMS value decides how fast to converge to an observation. In one embodiment, convergence speed may be regulated by creating an envelope around the observation value. The actual observation signal is as follows:

$\vartheta_o$+sin($\xi$), where $\xi$ is the width of the uncertainty envelope. In one embodiment, $\xi$ is 2 degrees.

The initial magnitude and duration of the oscillation is a good strategy for weaning out bad quality and potentially dangerous error estimates. It was found that the duration has less effect than magnitude. This is because the tail of a quickly dying oscillation would be at the level of noise itself. However, the oscillation must be long enough to contain at least the first few periods. Minimum values for these parameters can be obtained by studying the raw signals.

As was discussed for rotation axis estimation, extraction of signal intervals that fit a model of a damped oscillation are a guarantee for success of any algorithm working on that signal. Although it is easy to try to match the model to a signal stream and determine if it was a good match or not, it is not trivial to design an efficient algorithm for the parts that resemble the model adequately enough. Moreover, a simple goodness of fit measure such as MSE (mean squared error) can be too conservative, throwing away more than it should.

One important feature of the system is the separation of states into moving and static. Initially, the system does not know the true value of the swing angle. In this state, the system chases the true value of the swing angle by applying the error estimates, however large. The system computes statistics (e.g., mean and variance) of the incoming error estimates. Once the mean reaches zero and the variance becomes small enough, there is a high probability that the estimate has latched onto the true swing angle. This requires that the body be rocked enough times by moving the arm. An alternative way is for the operator of the excavator to hit a swing limit. Which method is quicker depends on the window size chosen for statistics computation. The benefit of transitioning into this state is that a lot more restrictions in gating observations can be afforded based on error estimates. The rationale is that, given the characteristic of gyroscope signals, and assuming the joint mechanism acts close enough to a single axis rotary joint, once equal to or close to the true angle, the main factor causing deviation is slow drift due to gyro random walk. In particular, while in this mode, the following safeguards can result in smooth estimates.

In most cases, swing angle observations $\vartheta_o$ fluctuate around the current swing angle estimate $\hat{\vartheta}$. The closer the swing angle estimate $\hat{\vartheta}$ is to the swing angle observations $\vartheta_o$, the larger is the probability that the swing angle observations $\vartheta_o$ is actually confirming the correctness of the swing angle estimate $\hat{\vartheta}$. Based on this intuition, in the system, the correction variance is adaptively changed if the current estimate falls inside [$\vartheta_o - \xi$, $\vartheta_o + \xi$]:

$$\varepsilon = \sigma_{\vartheta_o} + \frac{m}{(\xi/2)\sqrt{2\pi}} \exp \frac{(\vartheta - \vartheta_o)^2}{2(\xi/2)^2},$$

where m is the magnitude. Note that half of the width of the uncertainty envelope is equated to $2\sigma$ of the normal distribution.

Statistical outlier analysis can help reject spurious corrections if the distribution is known. If the estimated error mean $\hat{\mu}_{\delta\theta}$ and variance $\hat{\sigma}^2_{\delta\theta}$ are small enough, a normal PDF (probability density function) can be reasonably assumed to reflect the true error disribution. Therefore, the Z-test can be used to reject outliers. More formally, reject any estimated error $\hat{\delta\theta}$ is rejected if $Z_{\delta\theta} < 3$, where $$Z_{\delta\theta} = \frac{|\delta\theta - \hat{\mu}_{\delta\theta}|}{\sigma_{\delta\theta}}.$$

Another, much simpler strategy is to cap error magnitude to a limit. If the chosen limit is the same as the uncertainty region width, this effectively amounts to using error sign to center the estimate.

A similar strategy is to use an error deadband with the uncertainty envelope size. No correction will be applied to the filter is the angle estimate as long as it falls within the deadband.

The system works on the principle of continuous excitation. A given error estimate can thus be considered stale after it has been applied for a certain amount of time. This would prevent a stray error estimate from dragging the estimate for too long, especially when the operator stops operation and that particular correction happened to be the last one. Similarly, when the swing angle changes, the current correction (estimated before movement) must stop, and await subsequent observations.

After the initialization phase, where the estimate can be moving without any physical swinging happening, the magnitude of an error estimate must be commensurate with the amount of swing. In other words, the following is expected:

$$\int_{t_0}^{t_1} (\Delta\omega(\tau) - b_{\Delta\omega}(\tau)) d\tau \approx \hat{\delta\theta}(t_1) - \hat{\delta\theta}(t_0).$$

where $t_0$ and $t_1$ represent two consecutive times when error estimates arrived. Assume that $\hat{\delta\theta}(t_1)$ is an outlier and $\hat{\delta\theta}(t_0) \approx 0$. The integral is denoted by $\hat{\theta}_{t_1 - t_0}$. To handle this case, the system increases the correction variance according to the discrepancy $d_{t_1 - t_0} = \hat{\theta}_{t_1 - t_0} \hat{\delta\theta}(t_1)$:

$$\varepsilon = \sigma_{\vartheta_0} + \alpha(1 - \exp(-\lambda d_{t_1 - t_0})).$$

Slope Estimation

When the vehicle is positioned on a substantial slope, the observed swing angle $\vartheta_0$ can be computed in a more straightforward manner. The observed swing angle $\vartheta_0$ can be computed based on slope estimation by slope estimation module 408 of FIG. 4 based on the inclination determined by inclination estimation module 410. In one embodiment, the vehicle is considered to be situated on a substantial slope when the minimum of chassis roll and pitch angles is more than at least, e.g., six degrees (i.e., a 12 percent slope threshold) and remains constant during operation. This could be more than the desired slope for most applications and the assumption of chassis slope constancy can be easily violated on steep slopes. Additionally, the rotation of the cabin with respect to the tracks must be known. As the chassis is normally not instrumented, this would require a calibration phase every time the slope changes, and this can only be done if a GPS-based (or equivalent optical) guidance and/or automatic control system is already existing to provide heading of the cabin. However, if the above assumptions hold true, the gain is evident.

First, rotation matrix $R_{swing}^{body}$ is represented in a way that the axis of rotation of swing is made explicit. To do that, the matrix form of Rodrigues' formula is used:

$$R_{swing}^{body} = \cos(\theta) I_{3 \times 3} + \sin(\theta)[\times \vec{u}] + (1 - \cos(\theta)) \vec{u} \vec{u}^{T'}$$

where $\vec{u} \equiv \vec{u}_{swing}$ is the swing joint axis, $\theta$ is the angle of rotation of swing joint, and $\times \vec{u}$ is the skew-symmetric matrix, and $$\times \vec{u} \equiv \begin{pmatrix} 0 & -u_z & -u_y \\ u_z & 0 & -u_x \\ -u_y & u_x & 0 \end{pmatrix}.$$

Denoting the gravity vector by $\vec{g} = (0,0,g)^T$ ($g \approx -9.81$), the output of the accelerometer (at rest) is given by:

$$\vec{a} = (R_{swing}^{body})^T \vec{g}.$$

The above expression may be expanded for the case of a general direction sensor that is rotated around the vertical axis ($\vec{u} = (0,0,1)^T$) to show that the first two elements of the measurement (of an arbitrary direction) suffice to calculate the rotation angle, which is also unique inside $[-\pi, \pi]$. The same line of reasoning was followed for an arbitrary rotation (swing) axis and a fixed direction (gravity) to achieve the same result.

The above equation is expanded may be expanded to $$\begin{pmatrix} a_x \\ a_y \\ a_z \end{pmatrix} = -\sin(\theta) \begin{pmatrix} g_z u_y - g_y u_z \\ g_x u_z - g_z u_x \\ g_y u_x - g_x u_y \end{pmatrix} +$$

$$\cos(\theta) \begin{pmatrix} g_x \\ g_y \\ g_z \end{pmatrix} + (1 - \cos(\theta)) \begin{pmatrix} g_z u_x u_z + g_y u_x u_y + g_x u_x^2 \\ g_z u_y u_z + g_y u_y^2 + g_x u_x u_y \\ g_z u_z^2 + g_y u_y u_z + g_x u_x u_z \end{pmatrix}.$$

where the left-hand side is the accelerometer output. To reduce the above expression into the special (and more manageable) case, a change of basis is performed that maps $\vec{u}$ into $(0,0,1)^T$. In other words, such a coordinate change maps the 3D space into the 2D dimensional subspace recognized as the plane of rotation whose normal vector is $\vec{u}$. Such a transformation would map $\vec{g}$ into $$\vec{g}_{\vec{u}} = T_{\vec{u}} \vec{g},$$

where $T_{\vec{u}}$ is an appropriate linear operator (3 by 3 matrix). It can now be shown that $$\vec{a} = \begin{pmatrix} \cos(\theta) & \sin(\theta) & 0 \\ -\sin(\theta) & \cos(\theta) & 0 \\ 0 & 0 & 1 \end{pmatrix} \vec{g}_{\vec{u}}.$$

The above equation can be compactly represented as complex numbers:

$$a_x + i a_y = e^{i\theta}(g_{x,\vec{u}} + i g_{y,\vec{u}}),$$

which implies that $$\hat{\theta} = \arctan\left(\frac{a_y}{a_x}\right) - \arctan\left(\frac{g_{y,\vec{u}}}{g_{x,\vec{u}}}\right),$$

relating $\theta$ to the phase of accelerometer data and the initial phase before rotation (or in other words the amount of rotation of the cabin around its axis). Although a convenient formulation to demonstrate non-observability of the swing rotation in the general case, working with raw accelerometer data is difficult (due to noise and linear acceleration) and the above correction can only be applied at certain times when estimated gravity is stable. The effort to estimate gravity can instead be spent to estimate swing IMU pitch and roll, thus leveraging the behavior of the gyroscopes as well. Assuming for now that the IMU pitch and roll is available, the formula $$\theta = \arcsin\left(\frac{\sin(\psi)}{(\sin^2(\phi) + \cos^2(\psi))^{1/2}}\right)$$

gives direction on a slope, which is equivalent to the swing angle. From the swing angle, the rotation of the cabin is subtracted to provide the observed swing angle $\vartheta_o$. The slope is given by:

$$\xi = \arcsin(\sin^2(\phi) + \cos^2(\psi))^{1/2}.$$

However, for direction (swing) angle to be observable, the magnitudes of either pitch or roll or both should exceed a threshold. The above measure outputs the same value as long as pitch and roll are equal, regardless of magnitude. As the rotation axis approached the vertical, the observability starts to vanish, corresponding to infinite variance.

Using the Swing Boom Sensor

In some embodiments, the vehicle may already be instrumented with existing sensors (e.g., IMUs). In these embodiments, the kinematic angle estimation module can receive the sensor data from the existing sensors, thereby reducing costs. The formulation of the error estimation will not change. However the complexity will increase and deterioration of the quality of the estimation is possible. This is because the existing sensor on the swing boom will measure two motions: body motion as well as swing boom motion with respect to the body. Thus, the swing to body rotation matrix estimation will no longer be sufficient and should include a pitch component. The challenge will be to extract the common motion where the existing sensors undergo the same pitch motion. Any residual pitch component will add to the error.

The computation of inclination (pitch and roll) for points of interest on the machine, specifically the body, the swing link, and the boom, will first be considered. Attitude estimation may be performed using the unit quaternion representation of rotations and employing a Kalman-type filter as an observer. Other representations (e.g., DCM (direction cosine matrix) and Euler angles) and observers (e.g., complimentary filters and nonlinear observers) may be employed.

Denoting by $q = (q_w, q_x, q_y, q_z)$ the unit quaternion encoding the attitude of an IMU, such as the cabin, swing or boom, its time evolution is governed by $$\dot{q} = \frac{1}{2} q \otimes (\omega_Q - b_Q) =$$

$$\frac{1}{2}[q \times_Q](\omega_Q - b_Q) = \frac{1}{2}[q \times_Q]\omega_Q - \frac{1}{2}[q \times_Q]b_Q = \frac{1}{2}[\times_Q \omega_Q]q - \frac{1}{2}[q \times_Q]b_Q,$$

where $r_Q = (0\ r)^T$, $r \in \mathbb{R}^3$, $\vec{\omega}$ are gyroscope outputs $\vec{\omega}_{body}$, $\vec{\omega}_{swing}$ or $\vec{\omega}_{boom}$, $b = (b_x\ b_y\ b_z)$ are gyro biases, $\otimes$ denotes quaternion multiplication and $$[q \times_Q] = \begin{pmatrix} q_w & -q_x & -q_y & -q_z \\ q_x & q_w & -q_z & q_y \\ q_x & q_z & q_w & -q_x \\ q_z & -q_y & q_x & q_w \end{pmatrix},$$

$$[\times_Q q] = \begin{pmatrix} q_w & -q_x & -q_y & -q_z \\ q_x & q_w & q_z & -q_y \\ q_y & -q_z & q_w & q_x \\ q_z & q_y & -q_x & q_w \end{pmatrix},$$

and the equality $$q_1 \otimes q_2 = [q_1 x_Q]q_2 = [x_Q q_2]Q_1$$

in the last equation. The state of the filter is $x_n = (q_n, b_n)^T$, and the filter estimates biases. Zero order forward integration can be used to derive the discrete time state evolution equation for the extended Kalman filter:

$$\hat{q}_{n+1} = \cos(\|\vec{\omega}\| \Delta t/2)\hat{q}_n + \frac{1}{\|\vec{\omega}\|}\sin(\|\vec{\omega}\| \Delta t/2)[\times_Q \vec{\omega}_Q]\hat{q}_n,$$

$$\hat{b}_{n+1} = \hat{b}_n.$$

The state transition matrix and the noise matrices are given by $$A_n = \begin{pmatrix} I_{4\times 4} + \dfrac{\delta T}{2}[\times_Q \omega_Q] & -\dfrac{\delta T}{2}[q_n \times_Q] \\ 0_{3\times 4} & I_{3\times 3} \end{pmatrix}, \text{ and}$$

$$W_n = \begin{pmatrix} \dfrac{\delta T}{2}[q_n \times_Q] & 0_{4\times 3} \\ 0_{3\times 4} & I_{3\times 3} \end{pmatrix}.$$

Note that the yaw angle is not of interest and therefore an observation for the yaw angle is not provided for. To correct for pitch and roll, assume for the moment that an estimate of the gravity vector expressed in the IMU local frame $\hat{g}$ is available. An innovation can be computed by $$\hat{g} - R(\hat{q})^T (0\ 0\ g)^T,$$

where $R(\hat{q})$ is the rotation matrix representation as a function of the quaternion attitude. Thus, the observation matrix is given by $$H_n(\hat{q}_n) = \frac{\partial}{\partial q} R(\hat{q}_n) \begin{pmatrix} 0 \\ 0 \\ 1 \end{pmatrix} = 2 \begin{pmatrix} q_y & q_z & q_w & q_x \\ -q_x & -q_w & q_z & q_y \\ q_w & -q_x & -q_y & q_z \end{pmatrix}.$$

There are two major methods for estimating the gravity vector: static and dynamic.

Static: Only correct the filter during times when the accelerometer output is equal to gravity in local IMU frame. This is the case when the accelerometer output has small enough variance and its magnitude is close enough to g. Then, using the energy-based strategy, the stationary hypothesis ($H_1$) can be decided if both of the following relations hold true:

$$\frac{1}{\sigma_a^2 N} \sum_{k=1,\ldots,N} \|\vec{a}_k - \bar{a}\|^2 < \gamma_1,$$

$$\frac{1}{\sigma_a^2 N} \sum_{k=1,\ldots,N} (\|\vec{a}_k\| - g)^2 < \gamma_2.$$

where $\sigma_\alpha^2$ is a scale factor in this special case. The downside to this method is that if the machine does not settle down often enough and long enough, corrections might not be frequent enough. To overcome this limitation, $\gamma$ can be increased, along with the error variance of correction. A major benefit of this method, besides simplicity, is its independence from knowledge of the kinematics of the machine.

Dynamic: Compensate for linear acceleration and correct the filter all the time. This method is preferred in very dynamic and/or noisy environments. The compensation may be performed by adaptively changing the observation covariance matrix. This may be performed using robust Kalman filters, particularly if the acceleration can be computed with enough accuracy.

Generally, if $p_{imu}(t)$ denotes the position of an IMU in global space, considered as the end point of a serial mechanism whose base is located at $p_{base}(t)$ (for example, the center of the body), this results in:

$$P_{imu}(t) = P_{base}(t) + K_{DH}(\theta),$$

where $K_{DH}(\theta)$ denotes the kinematic mapping computed using the Denavit-Hartenberg convention and $\theta$ is the vector of angles of the joints. Likewise, $$v_{imu}(t) = v_{base}(t) + J(\theta)\dot{\theta},$$

where $$J(\Theta) = \frac{\partial}{\partial \Theta} K_{DH}(\Theta)$$

is the Jacobian of the serial link mechanism and $\dot{\theta}$ are rates of turn of the corresponding joints. Assuming that the body is static during operation (which is a reasonable assumption barring occasional slippage), the linear acceleration sensed by the sensor is the representation of the acceleration by which the IMU is traveling in space in local sensor frame:

$$\hat{a}_{imu}(t) = R_{imu}^T(t) \frac{d}{dt} J(\Theta)\dot{\Theta}.$$

Thus, the local gravity for correcting the attitude filter is estimated as $\hat{g}_{imu} = f_{imu} - \hat{a}_{imu}$. The above applies to body, swing, and boom IMUs, for which $\theta$ will be ($\theta_{body}$), ($\theta_{body}$, $\theta_{swing}$), and ($\theta_{body}$, $\theta_{swing}$, $\phi_{boom}$), respectively. Similarly, $\theta$ will be ($\omega_{z,body}$), ($\omega_{z,body}$, $\omega_{z,swing} - \omega_{z,body}$) and ($\omega_{z,body}$, $\omega_{z,swing} - \omega_{z,body}$, $\omega_{y,boom} - \omega_{y,swing}$).

The kinematic map and its Jacobian will also be a function of certain lengths that are normally measured up as part of machine calibration. These are: horizontal distance between base and body IMU, horizontal distance between base and swing joint, distance between swing joint and swing IMU, distance between swing joint and boom joint, and distance between boom joint and boom IMU.

Finally, a scheme based on linear acceleration estimation will generally be more robust if some sort of adaptive variance is applied, especially to cover uncertain cases such as when the body slips or starts moving and velocity information is not available (as is the case in this system).

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 4-6 and 18. Certain steps or functions of the methods and workflows described herein, including one or more of the steps or functions of FIGS. 4-6 and 18, may be performed by a server or by another processor in a network-based cloud-computing system. Certain steps or functions of the methods and workflows described herein, including one or more of the steps of FIGS. 4-6 and 18, may be performed by a client computer in a network-based cloud computing system. The steps or functions of the methods and workflows described herein, including one or more of the steps of FIGS. 4-6 and 18, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 4-6 and 18, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 20:
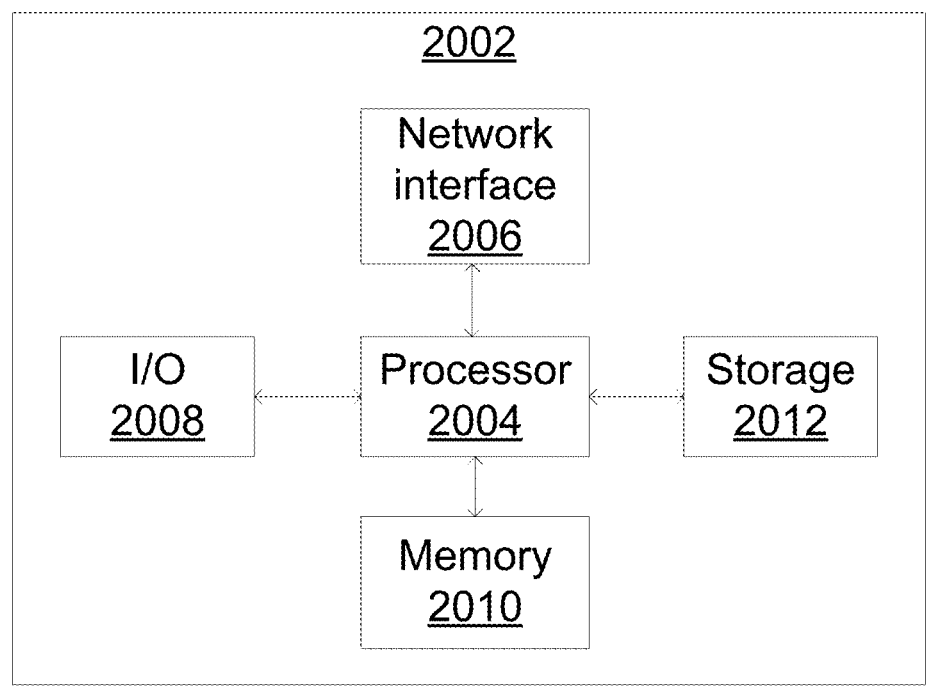
FIG. 20 shows a high-level block diagram of a computer that may be used to implement one or more embodiments.

A high-level block diagram of an example computer 2002 that may be used to implement systems, apparatus, and methods described herein is depicted in FIG. 20. Computer 2002 includes a processor 2004 operatively coupled to a data storage device 2012 and a memory 2010. Processor 2004 controls the overall operation of computer 2002 by executing computer program instructions that define such operations. The computer program instructions may be stored in data storage device 2012, or other computer readable medium, and loaded into memory 2010 when execution of the computer program instructions is desired. Thus, the method and workflow steps or functions of FIGS. 4-6 and 18 can be defined by the computer program instructions stored in memory 2010 and/or data storage device 2012 and controlled by processor 2004 executing the computer program instructions. For example, the computer program instructions can be implemented as computer executable code programmed by one skilled in the art to perform the method and workflow steps or functions of FIGS. 4-6 and 18. Accordingly, by executing the computer program instructions, the processor 2004 executes the method and workflow steps or functions of FIGS. 4-6 and 18. Computer 2002 may also include one or more network interfaces 2006 for communicating with other devices via a network. Computer 2002 may also include one or more input/output devices 2008 that enable user interaction with computer 2002 (e.g., display, keyboard, mouse, speakers, buttons, etc.).

Processor 2004 may include both general and special purpose microprocessors, and may be the sole processor or one of multiple processors of computer 2002. Processor 2004 may include one or more central processing units (CPUs), for example. Processor 2004, data storage device 2012, and/or memory 2010 may include, be supplemented by, or incorporated in, one or more application-specific integrated circuits (ASICs) and/or one or more field programmable gate arrays (FPGAs).

Data storage device 2012 and memory 2010 each include a tangible non-transitory computer readable storage medium. Data storage device 2012, and memory 2010, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 2008 may include peripherals, such as a printer, scanner, display screen, etc. For example, input/output devices 2008 may include a display device such as a cathode ray tube (CRT) or liquid crystal display (LCD) monitor for displaying information to the user, a keyboard, and a pointing device such as a mouse or a trackball by which the user can provide input to computer 2002.

Any or all of the systems and apparatus discussed herein may be implemented using one or more computers such as computer 2002.

One skilled in the art will recognize that an implementation of an actual computer or computer system may have other structures and may contain other components as well, and that FIG. 20 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
    receiving sensor data from sensors disposed on a swing boom and a body of a vehicle;
    determining whether the swing boom is static or moving relative to the body based on the sensor data;
    in response to determining that the swing boom is static, correcting, by a processor, the received sensor data based on an observed swing angle and calculating, by the processor, an estimated swing angle based on the corrected sensor data, wherein correcting the received sensor data based on the observed swing angle and calculating the estimated swing angle based on the corrected sensor data comprises:
        comparing the observed swing angle with a last estimated swing angle; and
        removing bias from the sensor data based on the comparing;
    in response to determining that the swing boom is moving, calculating, by the processor, the estimated swing angle based on the received sensor data; and
    outputting the estimated swing angle by at least one of:
        displaying the estimated swing angle to an operator of the vehicle via a user interface displayed on a display device of the vehicle; or
        automatically controlling the vehicle based on the estimated swing angle.

2. The computer-implemented method of claim 1, wherein determining whether the swing boom is static or moving relative to the body based on the sensor data comprises:
    calculating an energy of a signal received from the sensors;
    comparing the calculated energy to one or more thresholds; and
    determining whether the swing boom is static or moving based on the comparing.

3. The computer-implemented method of claim 1, further comprising:
    determining that the estimated swing angle exceeds a swing limit of the vehicle; and
    resetting a Kalman filter used for calculating the estimated swing angle.

4. The computer-implemented method of claim 1, further comprising calculating the observed swing angle by:
    determining rotation axes of the sensors; and
    calculating the observed swing angle based on the determined rotation axes.

5. The computer-implemented method of claim 1, further comprising calculating the observed swing angle by:
    determining a swing angle error by transfer alignment; and
    calculating the observed swing angle based on the swing angle error.

6. The computer-implemented method of claim 1, further comprising calculating the observed swing angle by:
    in response to determining that the vehicle is situated on a slope satisfying a slope threshold, calculating the observed swing angle based on a roll and pitch of the vehicle.

7. The computer-implemented method of claim 1, wherein the sensors are IMUS (inertial measurement units).

8. The computer-implemented method of claim 1, wherein the vehicle is an excavator.

9. A system comprising:
    a memory storing computer program instructions; and
    at least one processor configured to execute the computer program instructions, the computer program instructions configured to cause the at least one processor to perform operations of:
        receiving sensor data from sensors disposed on a swing boom and a body of a vehicle;
        determining whether the swing boom is static or moving relative to the body based on the sensor data;
        in response to determining that the swing boom is static, correcting the received sensor data based on an observed swing angle and calculating an estimated swing angle based on the corrected sensor data, wherein correcting the received sensor data based on the observed swing angle and calculating the estimated swing angle based on the corrected sensor data comprises:
            comparing the observed swing angle with a last estimated swing angle; and
            removing bias from the sensor data based on the comparing;
        in response to determining that the swing boom is moving, calculating the estimated swing angle based on the received sensor data; and
        outputting the estimated swing angle by at least one of:
            displaying the estimated swing angle to an operator of the vehicle via a user interface displayed on a display device of the vehicle; or
            automatically controlling the vehicle based on the estimated swing angle.

10. The system of claim 9, wherein determining whether the swing boom is static or moving relative to the body based on the sensor data comprises:
    calculating an energy of a signal received from the sensors;
    comparing the calculated energy to one or more thresholds; and
    determining whether the swing boom is static or moving based on the comparing.

11. The system of claim 9, the operations further comprising:
    determining that the estimated swing angle exceeds a swing limit of the vehicle; and
    resetting a Kalman filter used for calculating the estimated swing angle.

12. The system of claim 9, the operations further comprising calculating the observed swing angle by:
    determining rotation axes of the sensors; and calculating the observed swing angle based on the determined rotation axes.

13. A non-transitory computer readable medium storing computer program instructions, the computer program instructions when executed by a processor cause the processor to perform operations comprising:
receiving sensor data from sensors disposed on a swing boom and a body of a vehicle;
determining whether the swing boom is static or moving relative to the body based on the sensor data;
in response to determining that the swing boom is static, correcting the received sensor data based on an observed swing angle and calculating an estimated swing angle based on the corrected sensor data, wherein correcting the received sensor data based on the observed swing angle and calculating the estimated swing angle based on the corrected sensor data comprises:
comparing the observed swing angle with a last estimated swing angle; and
removing bias from the sensor data based on the comparing;
in response to determining that the swing boom is moving, calculating the estimated swing angle based on the received sensor data; and
outputting the estimated swing angle by at least one of:
displaying the estimated swing angle to an operator of the vehicle via a user interface displayed on a display device of the vehicle; or
automatically controlling the vehicle based on the estimated swing angle.

14. The non-transitory computer readable medium of claim 13, the operations further comprising calculating the observed swing angle by:
determining a swing angle error by transfer alignment; and
calculating the observed swing angle based on the swing angle error.

15. The non-transitory computer readable medium of claim 13, the operations further comprising calculating the observed swing angle by:
in response to determining that the vehicle is situated on a slope satisfying a slope threshold, calculating the observed swing angle based on a roll and pitch of the vehicle.

16. The non-transitory computer readable medium of claim 13, wherein the sensors are IMUS (inertial measurement units).

17. The non-transitory computer readable medium of claim 13, wherein the vehicle is an excavator.

18. An excavator comprising:
a first sensor disposed on a swing boom of the excavator;
a second sensor disposed on a body of the excavator;
a memory storing computer program instructions; and
at least one processor configured to execute the computer program instructions, the computer program instructions configured to cause the at least one processor to perform operations of:
receiving sensor data from the first sensor and the second sensor;
determining whether the swing boom is static or moving relative to the body based on the sensor data;
in response to determining that the swing boom is static, correcting the received sensor data based on an observed swing angle and calculating an estimated swing angle based on the corrected sensor data, wherein correcting the received sensor data based on the observed swing angle and calculating the estimated swing angle based on the corrected sensor data comprises:
comparing the observed swing angle with a last estimated swing angle; and
removing bias from the sensor data based on the comparing;
in response to determining that the swing boom is moving, calculating the estimated swing angle based on the received sensor data; and
outputting the estimated swing angle by at least one of:
displaying the estimated swing angle to an operator of the excavator via a user interface displayed on a display device of the excavator; or
automatically controlling the excavator based on the estimated swing angle.

* * * * *